US010197731B2

(12) United States Patent
Teng et al.

(10) Patent No.: US 10,197,731 B2
(45) Date of Patent: Feb. 5, 2019

(54) OPTICAL COUPLER

(71) Applicant: Purdue Research Foundation, West Lafayette, IN (US)

(72) Inventors: Min Teng, West Lafayette, IN (US); Minghao Qi, West Lafayette, IN (US); Ben Niu, West Lafayette, IN (US); Justin Christopher Wirth, Muncie, IN (US); Sangsik Kim, West Lafayette, IN (US); Kyunghun Han, West Lafayette, IN (US); Yi Xuan, West Lafayette, IN (US); Yun Jo Lee, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/694,277

(22) Filed: Sep. 1, 2017

(65) Prior Publication Data
US 2018/0067259 A1 Mar. 8, 2018

Related U.S. Application Data

(60) Provisional application No. 62/383,145, filed on Sep. 2, 2016.

(51) Int. Cl.
*G02B 6/12* (2006.01)
*G02B 6/30* (2006.01)
(Continued)

(52) U.S. Cl.
CPC ............ *G02B 6/1228* (2013.01); *G02B 6/30* (2013.01); *G02B 6/3881* (2013.01); *G02B 6/3885* (2013.01); *G02B 2006/12061* (2013.01)

(58) Field of Classification Search
CPC .............................. G02B 6/1228; G02B 6/305
See application file for complete search history.

(56) References Cited

U.S. PATENT DOCUMENTS

| 6,411,765 B1 * | 6/2002 | Ono .................... G02B 6/12002 385/129 |
| 9,726,821 B2 | 8/2017 | Murray et al. |
(Continued)

OTHER PUBLICATIONS

Almeida, V., "Nanotaper for Compact Mode Conversion", Optics Letters, Aug. 1, 2003, vol. 28, No. 15, pp. 1302-1304.
(Continued)

*Primary Examiner* — Omar R Rojas
(74) *Attorney, Agent, or Firm* — Lee & Hayes, P.C.

(57) ABSTRACT

A semiconductor photonic device includes a substrate, facet(s), and optical coupler(s) associated with the facet(s). Each optical coupler can couple an electromagnetic field incident on the respective facet towards the substrate as the electromagnetic field proceeds into the semiconductor photonic device. In some examples, each coupler has waveguides extending in a longitudinal direction and at least partly encapsulated within corresponding cladding layers. A first waveguide extends farther from the facet in the longitudinal direction than does a second waveguide. The second waveguide is located farther above the silicon substrate than is the first waveguide. The coupler can include a stack of waveguide assemblies. A lower waveguide assembly can include one waveguide. An intermediate or upper waveguide assembly can include multiple waveguides. In some examples, at least one waveguide tapers along its length.

19 Claims, 31 Drawing Sheets

(51) Int. Cl.
    *G02B 6/122*     (2006.01)
    *G02B 6/38*     (2006.01)

(56) References Cited

U.S. PATENT DOCUMENTS

| | | | |
|---|---|---|---|
| 9,759,864 | B2 | 9/2017 | Painchaud et al. |
| 9,904,011 | B2* | 2/2018 | Hatori .................. G02B 6/1228 |
| 2014/0294341 | A1 | 10/2014 | Hatori et al. |
| 2018/0120504 | A1 | 5/2018 | Qi et al. |

OTHER PUBLICATIONS

Barwicz, et al., "Automated, Self-Aligned Assembly of 12 Fibers per Nanophotonic Chip with Standard Microelectronics Assembly Tooling", retrieved Aug. 24, 2017 from <<https://researcher.watson.ibm.com/researcher/files/us-tymon/p329.pdf>>, 8 pages.

Barwicz, T., "An O-Band Metamaterial Converter Interfacing Standard Optical Fibers to Silicon Nanophotonic Waveguides", Optical Society of America, 2015, 3 pages.

Barwicz, T., et al., "Three-Dimensional Analysis of Scattering Losses Due to Sidewall roughness in Microphotonic Waveguides", Journal of Lightwave Technology, vol. 23, No. 9, Sep. 2005, 14 pages.

Berenger, J-P., "A Perfectly Matched Layer for the Absorption of electromagnetic Waves", Journal of Computational Physics, 114, Jul. 2, 1993, pp. 185-200.

"Corning SMF-28 Optical Fiber", Product Information, retrieved Aug. 26, 2016, Issued Apr. 2002, 4 pages.

Fiber Optic Splicing Guide—Tec Alerts, Tecra Tools, retrieved Aug. 24, 2017, from <<http://www.tecratools.com/pages/tecalert/splicing_guide.html>>. 3 pages.

"Fiber Optic V-Grooves & Arrays", Fiberguide Industries, retrieved Aug. 23, 2017, from <<http://www.fiberguide.com/wp-content/uploads/2012/08/V-Grooves_Arrays_FINAL.pdf>>, 2 pages.

Hatori, N., et al., "A Hybrid Integrated Light Source on a Silicon Platform Using a Trident Spot-Size Converter", Journal of Lightwave Technology, vol. 32, No. 7, Apr. 1, 2014, pp. 1329-1336.

Khilo, A., "Efficient Planar Fiber-to-Chip Coupler Based on Two-Stage Adiabatic Evolution", Optical Society of America, Jul. 19, 2010, vol. 18, No. 15, 17 pages.

McNab, S., "Ultra-Low Loss Photonic Integrated Circuit With Membrane-Type Photonnic Crystal Waveguides", Optical Express, Nov. 2003, vol. 11, No. 22, pp. 2927-2939.

Ren, G., et al., "Sutdy on Inverse Taper Based Mode Transformer for low loss Coupling Between Silicon Wire Waveguide and Lensed Fiber", Optics Communications 284, 2011, pp. 4782-4788.

Wood, M., "Complact Cantilever Couplers for Low-Loss Fiber Coupling to Silicon Photonic Integrated Circuits", Optical Society of America, Dec. 19, 2011, vol. 20, No. 1, 9 pages.

"Bragg Gratings", RP Photonics Encyclopedia of Laser Physics and Technology, retrieved Oct. 25, 2016 from <<https://www.rp-photonics.com/bragg_gratings.html>>, 2 pages.

Cheben, P., et al., "Broadband polarization independent nanophotonic coupler for silicon waveguides with ultra-high efficiency", Optics Express, vol. 23, No. 17, Aug. 18, 2015, 22553-22563.

"Core-less End Caps", RP Photonics Encyclopedia of Laser Physics and Technolgoy, retrieved Oct. 25, 2016 from <<https:www.rp-photonics.com/core_less_end_caps.html>>, 2 pages.

"Fiber-coupled Diode Lasers", RP Photonics Encyclopedia of Laser Physics and Technology, retrieved Oct. 25, 2016 from <<https://www.rp-photonics.com/fiber_coupled_diode_lasers.html>>, 4 pages.

Halir, R., et al, "Waveguide sub-wavelength structures: a review of principles and applications", Laser Photonics Rev. 9, No. 1, Jan. 2015, pp. 25-49.

Tu, et al., "Low Polarization-Dependent-Loss Silicon Photonic Trident Edge Coupler Fabricated by 248 nm Optical Lithography", Asia Communications and Photonics Conference, Nov. 2015, 3 pages.

* cited by examiner

Z=0 TE

Z=0.5L0 TE

Z=0.5L0 TM

Z=L0 TE

Z=L0 TM

Z=L0+0.5L1 TE

Z=L0+0.5L1 TM

Z=L0+L1 TE

Z=L0+L1+0.5L2 TE

Z=L0+L1+0.5L2 TM

OPTICAL COUPLER

CROSS-REFERENCE TO RELATED APPLICATIONS

This application is a nonprovisional application of, and claims priority to and the benefit of, U.S. Patent Application Ser. No. 62/383,145, filed Sep. 2, 2016 and entitled "Optical Coupler," the entirety of which is incorporated herein by reference.

BRIEF DESCRIPTION OF THE DRAWINGS

Objects, features, and advantages of various aspects will become more apparent when taken in conjunction with the following description and drawings. Identical reference numerals have been used, where possible, to designate identical features that are common to the figures.

The attached drawings are for purposes of illustration and are not necessarily to scale.

DETAILED DESCRIPTION

Steps, operations, or features of various methods described herein can be performed in any order except when otherwise specified, or when data from an earlier step is used in a later step. Example method(s) described herein are not limited to being carried out by components particularly identified in discussions of those methods. Throughout this discussion, a term has the same meaning whether it is presented with or without subscripts (e.g., "SiO2" is the same as "SiO$_2$"), unless otherwise indicated.

FIGS. 1-8B show example configuration of optical couplers according to various aspects, and simulation data. FIGS. 9-22 show results of simulations of electromagnetic fields at various points along the direction of propagation of light through example couplers according to various aspects. As used herein, the terms "light" and "optical," and similar terms, are not restricted to the visible range. "Light" refers to electromagnetic radiation of whatever wavelength. Some examples couplers herein have waveguide and layer dimensions permitting effective coupling of at least one of the following ranges or bands of wavelengths of light: infrared (e.g., ~750 nm-~1 mm, near-infrared, far-infrared, visible (e.g., ~400 nm-~700 nm), ultraviolet, telecommunications (e.g., ~1260 nm-~1675 nm), or specific telecommunications bands (e.g., the "1310 window," ~1260 nm-~1360 nm, the "1550 window," ~1530 nm-~1565 nm, or ~1520 nm-~1620 nm).

Some examples include method(s) of manufacturing couplers. Such method(s) can include performing SOI CMOS fabrication processes, e.g., including deposition, masking, etching, or planarization steps, in any combination, to provide structures such as those described herein.

Various examples relate to an edge coupler for standard single mode fiber based on SOI substrate. Some example couplers include multiple inverse tapers (taper matrix) to guide optical mode during mode evolution, e.g., as discussed herein with reference to FIGS. 5-6B.

Si optoelectronics and photonic devices are increasingly popular. To communicate between such devices on chip, Si chips performing photonic processing couple light in and out of optical fibers. An example of such a fiber is CORNING SMF-28, designed for use in the λ=1310 nm window and the λ=1550 nm window commonly used in telecommunications. SMF-28 has a mode-field diameter of 9.2±0.4 μm at 1310 nm and of 10.4±0.8 μm at 1550 nm. However, Si devices require very small cross-sections, e.g., 0.25-0.5 μm in width and height. This is much smaller than mode-field diameter (e.g., approximately the core size) of optical fibers (e.g., ~9 μm). Therefore, a great deal of light is lost in a butt-coupling, e.g., from 9 μm diameter to 0.25 μm×0.5 μm. There is a need for a low-loss fiber-to-silicon light coupler.

Figure 1A:
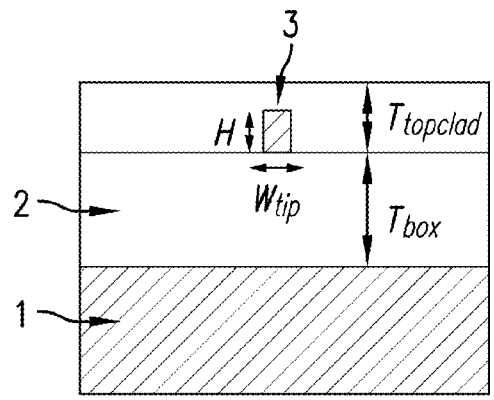
FIG. 1A shows a front view of an Si inverse taper without cladded waveguide.
Figure 1B:
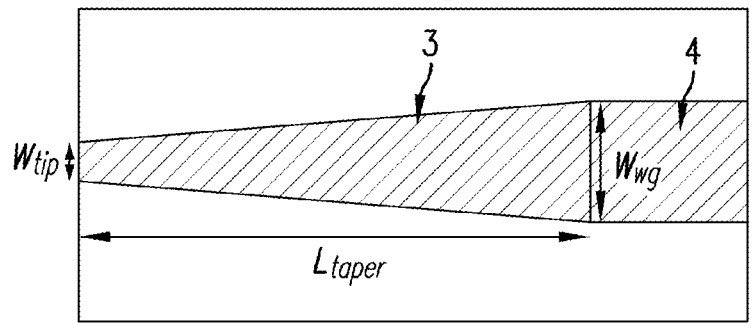
FIG. 1B shows a top view of an Si linear inverse tapered waveguide.

Silicon inverse nano-tapers are promising as fiber-to-chip edge couplers due to the perceived advantages of broadband performance and the ease of on-chip integration. Earliest developed Si inverse taper is developed by Lipson's group as shown in FIG. 1A and FIG. 1B, where Si taper 3 is embedded in SiO$_2$ 2. Top view shows taper width expands linearly from tip width $W_{tip}$ up to $W_{wg}$ (usually 450 nm for single mode Si waveguide with H=220 nm) in a length of $L_{taper}$. For taper fabricated on a SOI wafer, there is always a buried oxide (BOX) layer to avoid power leakage from waveguide 4 to Si substrate 1. Since most commercially available BOX has thickness less than 3 micrometers, hence this conventional inverse taper does not suit for standard cleaved fiber (SMF-28) with mode field diameter (MFD) ($1/e^2$ power diameter in a Gaussian profile) around 10 μm. A solution is to used lensed fiber to focus beam at taper tip such that input mode with strongly reduced size no longer suffer from leakage. Another alternative is to deploy tapered fiber core to achieve mode size reduction yet both techniques have not yet become a solution for industry due to its higher costs and significantly increased alignment and packaging challenge.

There are several design guidelines shared by designers when working on inverse taper embedded in SiO2 background. First and foremost, since there is no total internal reflection to trap the injected beam, the tip width at the facet should be carefully designed to trap the injected beam immediately at arrival. This request the facet cross-section support TE$_{00}$ and TM$_{00}$ mode with decent overlap with input Gaussian mode, although some mode mismatch loss at facet is introduced. Another idea is mode transition loss scales up with input MFD while down with taper length. Mode conversion efficiency can be strongly enhanced when mode center is aligned with Si taper.

In fact, even if bottom Si substrate is replaced by index matching material (no more leakage) with great effort, inverse taper based edge coupler still does not serve as good solution for SMF-28. An intuitive challenge is large input MFD requires excessive taper length to reduce transition loss even if mode is aligned with Si taper. Another problem is the birefringence introduced at tip coupling. In order to match with 10 um MFD input Gaussian mode, tip width has to be pretty narrow for 220 nm thick Si wafer. As taper tip is away from square shape, supported TE$_{00}$ and TM$_{00\ deviates}$ from each other meaning decent mode overlap at facet cannot be reached for both TE and TM polarizations. In at least one example, with discontinuous taper at subwavelength scale, tip can be designed as square shape to match both polarizations. With discontinuous metamaterial taper, 1.3 dB loss can be obtained for SMF-28 fiber, although suspended structure with index matching material filling is not an industrialized manufacturing process.

Figure 1C:
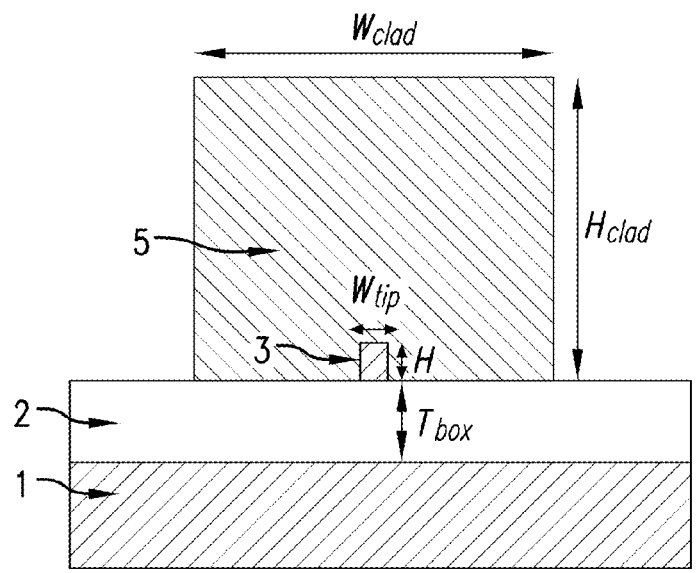
FIG. 1C shows a front view of an Si inverse tapered, cladded waveguide.

An alternative design of edge coupler for large MFD fiber is to clad an intermediate waveguide on top of Si taper, as shown in FIG. 1C. The waveguide has refractive index higher than that of BOX to confine the injected beam and its dimension supports fundamental mode overlapping nicely with input beam with huge MFD from standard cleaved fiber. Here $W_{tip}$ becomes trivial since mode is initially guided in intermediate cladded waveguide 5 when taper width is too narrow to guide. Given the same top view in FIG. 1B, $W_{tip}$ should be as narrow as possible to reduce overlap and index mismatch in order to achieve decent tip coupling efficiency. Such design however unavoidably causes vertical displacement between input beam and Si taper, rendering evanescent coupling much less efficient. In addition, only polymer material (such as SU-8) can become CMOS compatible candidates for intermediate waveguide, nonetheless organic polymer is not seen as reliable as SOI for commercial applications. In addition, multi-mode cladded waveguide can also lead to multimode-interference (especially given input misalignment), which can be undesirable.

Various examples include edge coupler on SOI platform without cladded waveguide meanwhile does not rely on Si substrate removal or index matching material filling. The solution is compatible with standard CMOS fabrication process and offers desirable tolerance to index variations.

Example embodiments involve the tip design at facet. For SMF input, mode can be trapped at several microns on top of BOX layer to reduce leakage towards substrate. This can be done with initially depositing thick SiO$_2$ first before building taper layer and ultimately covered with SiO$_2$ top cladding. The taper material can be (but not confined to) SiN (e.g., SiN$_x$, such as stoichiometric Si$_3$N$_4$, or other forms of silicon nitride) and amorphous Si. For trapping a large optical mode with low birefringence, high overlap, and robustness to index variations, multiple tips (e.g., in a matrix) can be used.

Figure 1D:
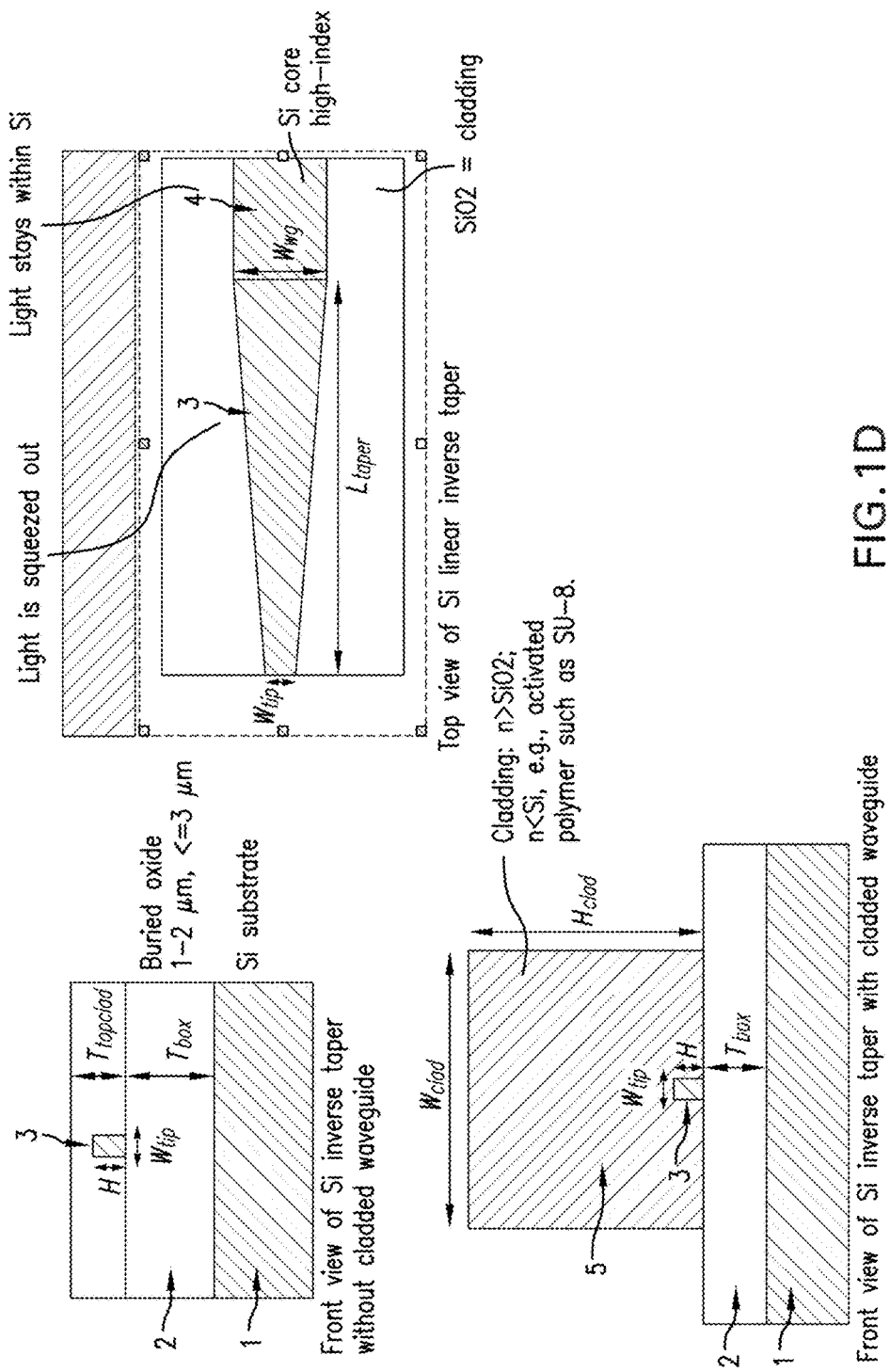
FIG. 1D shows examples of waveguides.

FIGS. 1A-1D illustrate a prior scheme, and shows a front view of an Si inverse taper coupler without a cladded waveguide. Vertically, the waveguide is constant-thickness. Examples are single-mode. In FIG. 1D, the note "light is squeezed out" refers to the fact that, as electromagnetic radiation progresses leftward and the tip width decreases, the amount of the electromagnetic energy carried in the Si core decreases (and the opposite for light moving from left to right).

FIG. 1B shows a top view of the Si linear inverse taper of FIG. 1A. In prior schemes, a light source, e.g., an optical fiber, is to the left side of FIG. 1B, and light can propagate from left to right. In area 3, cross-section (mode field diameter) expands. Expanded mode is about the same size as an optical fiber core. In area 4, the width is about 0.45 μm, so the light is confined.

However, structures as in FIG. 1 are limited by commercial silicon-processing limitation. For example, commercial-grade BOX is at most 3 μm thick, which limits the mode field width. Light that couples to the Si substrate will be lost. Therefore in order to reduce leakage towards substrate, the core of initial receiving waveguide is elevated.

FIG. 1C shows a prior scheme in which the fiber mode couples to the cladded waveguide and then is confined to within the taper. As the Si expands along the direction of propagation, the field is sucked into the core. The cladding can be made very large, e.g., the same size as the fiber mode. However, a large enough waveguide such as in FIG. 1C is a multi-mode guide, not a single-mode guide. Therefore, fiber misalignment can cause multi-mode interference because not only the fundamental mode, but also higher-order modes, of the waveguide will be excited. This results in coupling loss.

Figure 2A:
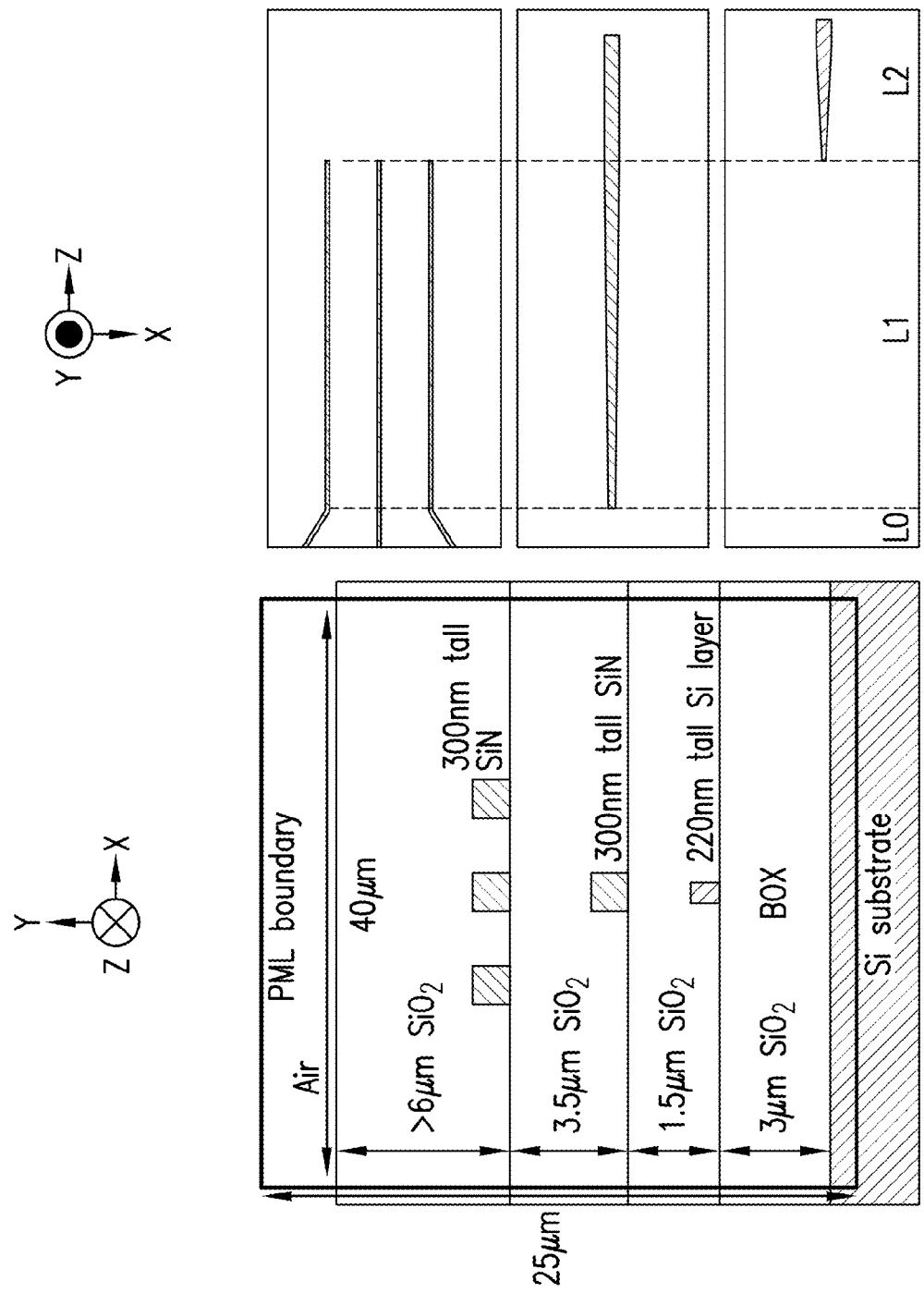
FIG. 2A shows a front view (left) and a top view (right) of a triple arm SiN chip-edge optical coupler.
Figure 2B:
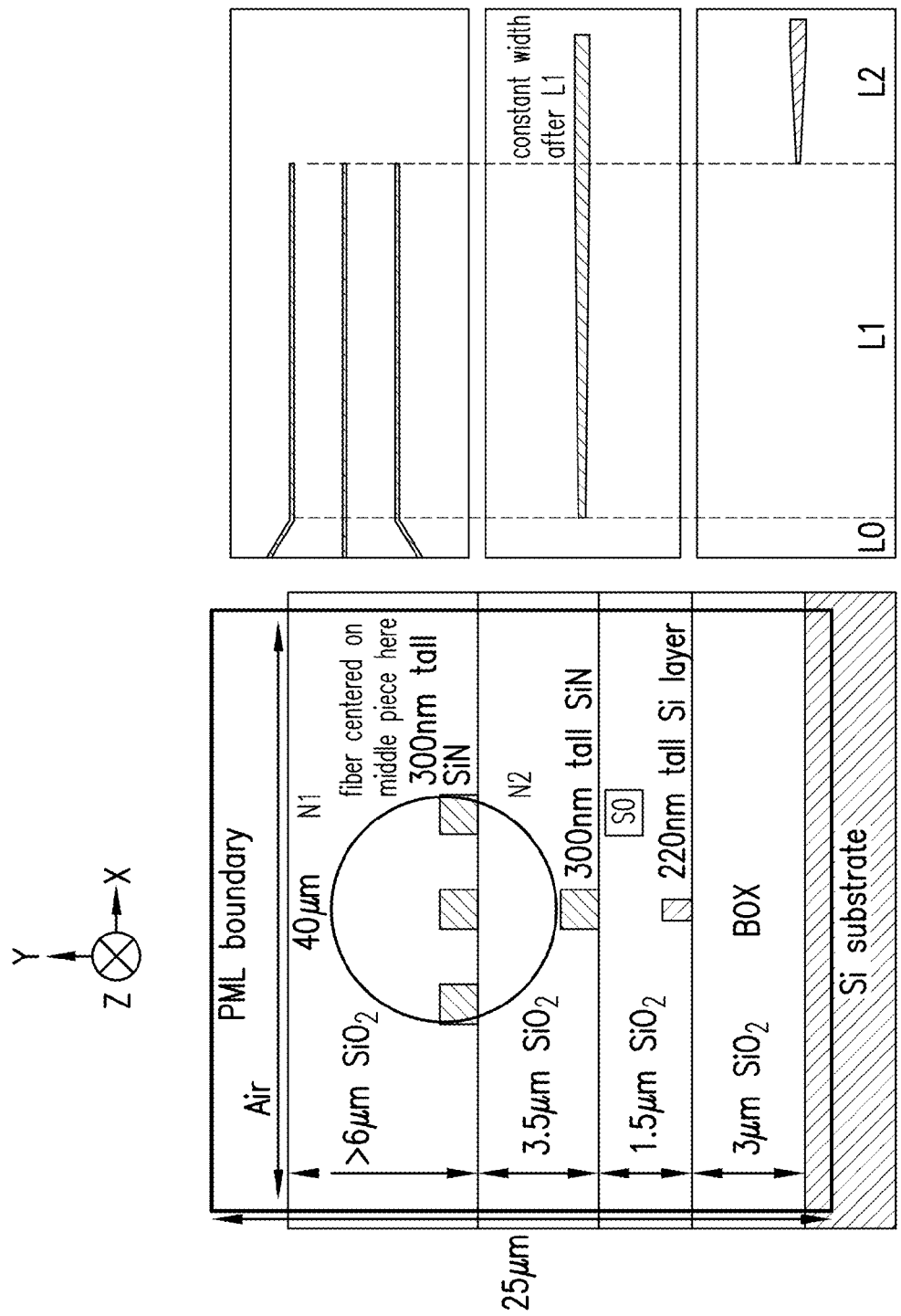
FIG. 2B shows further details of FIG. 2A.

FIGS. 2A-2B show an example configuration of an optical coupler. Various examples can be used with photonic or electro-optical devices, e.g., active units 2322, FIG. 23. Various examples of couplers can be used for any situation in which a change of mode field diameter is required, or in which the distance between the optical axis and a silicon (or other high-index) substrate has to be adjusted. Various examples can be used with non-silicon devices, e.g., III-V devices.

The left halves of FIGS. 2A and 2B show the view with light propagating from the fiber into the device into the plane of the figure. The right halves show three separate top views that can be stacked to show the full top view. In some examples, waveguides in the middle (N2) and bottom (S0) layers are tapered.

As shown in FIGS. 2A and 2B, one embodiment of the design (called triple arm SiN edge coupler) includes triple SiN tips at 5 um above BOX (layer N1). One layer of multiple SiN tips (N1, three tips in this embodiment) with 300 nm thickness is deposited to trap the incident beam assuming aligned with beam center. In some examples, each individual waveguide in N1 has a substantially constant width, e.g., 300 nm thick×160 nm wide. With 160 nm tip width and 1.8 μm center-to-center spacing, 92% TE and 90.5% TM facet coupling efficiency can be achieved with input fiber mode with 10 μm MFD. Similar to 'trident spot-size converter', triple arm SiN tips strictly support single mode hence multimode problem caused by input misalignment can be reduced or eliminated. The guided mode however is very weakly guided with some leakage. To solve the problem, tip spacing are gradually reduced to better confine the incident beam, with increased effective index (Neff) and reduced mode size. In some examples, N2 is omitted, and only N1 and S0 (Si) layers are used.

Figure 3:
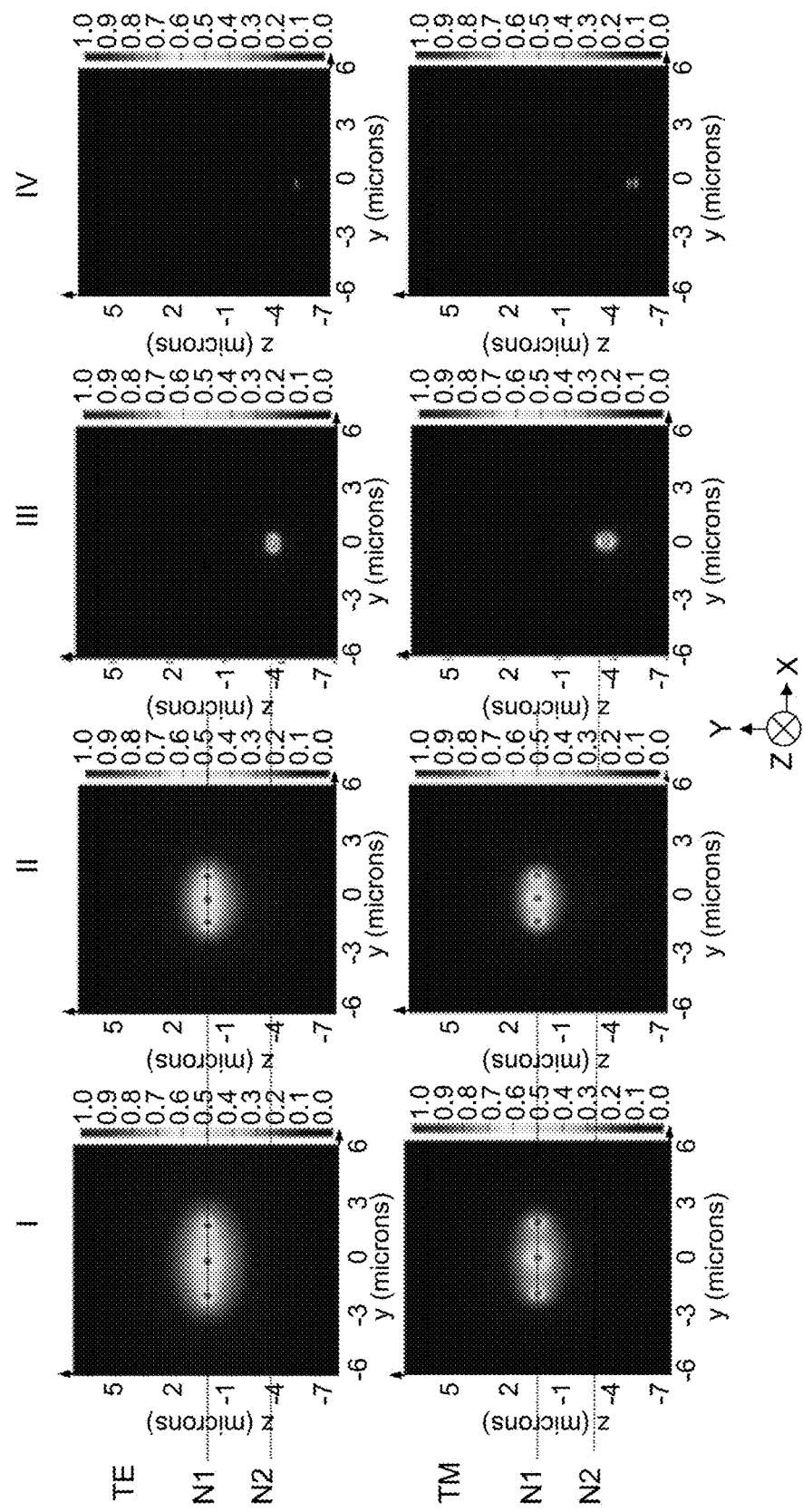
FIG. 3 shows results of a simulation of the electric-field magnitude of electromagnetic radiation of the (top row) $TE_{00}$ mode or (bottom row) $TM_{00}$ mode, at positions z=0, z=$L_0$, z=$L_1$, and z=$L_2$ (respectively from left to right) along the longitudinal axis of an example optical coupler such as that shown in FIGS. 2A and 2B.

At 1.5 um above BOX layer, there is also an intermediate SiN Layer (N2) which only appears $L_0$ distance into the facet. Then mode located at triple arms can vertically coupled to the intermediate SiN taper and ultimately coupled to Si taper (layer S0) as shown in FIG. 3. Intermediate SiN taper in layer N1 serves as a stepping-stone or intermediate coupling step layer that make the mode smaller and closer to Si taper in layer S0. Without intermediate SiN layer, direct mode coupling from triple arms in N2 down to Si taper in S0 can be performed using a longer Si taper, e.g., 2×, 3×, or longer compared to the length of the Si taper in S0 when using an intermediate waveguide (e.g., in N2). Compared to some prior schemes, example configurations can achieve the same functionality but on one SOI wafer alone, avoiding multiple wafer bonding steps. Various examples of waveguide arrangements shown in at least FIGS. 2A and 5 permit drawing the optical mode of incident radiation from the larger diameter of the fiber down towards the substrate and into the smaller waveguide (or vice versa, for emission).

In some examples, intermediate SiN taper, e.g., in the L1 region, works as a stepping-stone for evanescent coupling. The introduction of Si tip at L1/L2 interface does not cause significant mode mismatch loss. Spacing the intermediate SiN layer apart from the Si layer or increasing the width of the intermediate taper can help avoid increasing mode mismatch loss. In some example, a 400 nm wide waveguide 1.5 μm above the Si taper can provide less than 0.05 dB mismatch loss. Simulation results show that, when top layer tip center-to-center distance is reduced from 1.8 μm to 1.2 μm with 100 μm long $L_0$, 96% power transmission can be achieved at 700 μm taper length for both polarizations.

Throughout this document, terms such as "top," "middle," "bottom," "above," "below," "over," and "on top of," when used with respect to layers or structures in those layers, describe relative positions of those structures or layers, without regard to the orientation of the device or structure containing those structures or layers. For example, in FIGS. 2A and 2B, layer S0 is over the Si substrate; layer N2 is over layer S0 and the substrate; and layer N1 is over layer N2, layer S0, and the substrate. This is the case even if the chip including layers N1, N2, and S0, and the substrate, is turned upside-down or on edge.

CMOS processing can effectively produce ICs or other components that have multiple planarized layers. CMOS processing can provide precise control of film thickness (vertical) and waveguide widths (lateral). However, in the back-end-of-line (BEOL) process, films are required to be deposited at low temperatures (<400° C.) to avoid disturbing the dopant profiles. For example, SiN and $SiO_2$ are deposited by PECVD, which can lead to large variations in refractive indices. However, to increase the optical Mode field diameter (MFD), the refractive indices of the core and cladding are preferably close together, similar to the situation of optical fiber (e.g., $\Delta n<0.02$). Small variations of material indices will cause large MFD changes, affecting the coupling efficiency. Some schemes use nano tapers and metamaterial tapers, but those require high resolution lithography control, not generally compatible with CMOS processing, to match MFD of 10 μm. By contrast, various examples herein guide the light using structures that can be produced without high-resolution lithography, and that provide refractive index tolerance.

FIG. 3 shows example simulated mode profiles for the configuration of FIGS. 2A and 2B. The columns are numbered I-IV for ease of reference. The N1 and N2 layers (as shown in FIGS. 2A and 2B) are labeled with dotted lines. In a TE mode (top row), the E field is oscillating horizontally. In a TM mode (bottom row), the E field is oscillating vertically. Fiber has circular symmetry so doesn't distinguish TE from TM. Therefore, light coming in from the fiber may have any angle of linear polarization. However, for a coupler without circular symmetry, such as the structure shown, TE and TM differ in behavior. Therefore, when light from the fiber reaches the coupler, the light can be decomposed into TE and TM components (e.g., for purposes of analysis, or by structures in the coupler). Various examples have coupling coefficients substantially the same for TE as for TM, thus permitting effectively coupling incoming light from the fiber to the silicon waveguide (S0) regardless of the polarization angle of the light in the fiber. In the illustrated example, the input beam initially couples to a supermode at the tip arrays at the facet, then couples to the intermediate step (N2), and finally couples to the Si layer S0. With 300 nm thick triple SiN tips of 1.8 mm spacing, 160 nm tip width, and a 7 µm top cladding, facet coupling efficiency can reach 92% for TE and 90% for TM. This example also provides tolerance to misalignment: over 70% tip coupling efficiency for 1.5 µm misalignment in both x and y directions, in both TE and TM.

The vertical positions of intermediate SiN Layer N2 can be optimized for different design guidelines. The mode evolution is achieved in two parts: firstly coupling from triple arms to intermediate layer and secondly from intermediate layer down to Si layer. When vertically closer to triple SiN arms, first part increases in efficiency while the second part decreases in efficiency. In some embodiments, the intermediate layer is vertically closer to Si layer in order to reduce Si taper length. This is due to the consideration that Si/SiO2 interfaces can suffer scattering loss orders of magnitude higher than SiN/SiO2, as discussed below. Hence some examples trade Si taper length with SiN length in order to suppress accumulated scattering loss.

When light arrives from the fiber, the light initially only interacts with the three upper SiN nitrides (N1). N1 is ~8 µm above the Si substrate. Center of fiber is aligned with center of N1 in some examples. As the three nitrides approach each other, the mode profile shrinks because the high-index cores are closer together.

If only one waveguide were used (300 nm×160 nm wide), the light would not be effectively combined. In some examples, two waveguides are used, each with a wider width than 160 nm.

By the time the light reaches the L0 interface, the mode has shrunk. However, there still a need to shift the center of the field (the optical axis) vertically towards the Si substrate, e.g., to move the light down by ~5 µm.

Therefore, the N2 waveguide is used. There is a taper on the N2 waveguide. In some examples, for the Nitride 2 (middle nitride), the tip width can be ≤80 nm, and can be linearly tapered to a final width of ~400 nm. The total taper length for the middle nitride waveguide can be, e.g., 800 µm.

FIG. 3, column II, shows how the field has shrunk due to the initial merging of the N1 waveguides towards each other. The N2 waveguide expands horizontally, but not in thickness, in this example. The light travels in both N1 and N2. As the N2 waveguide expands, light redistributes from N1 to N2. In some examples, the N1 waveguides can shrink as the N2 waveguide expands. In other examples, e.g., FIGS. 2A and 2B, the N1 waveguides can have a substantially constant width between L0 and L0+L1. N2 has a higher capability to confine the light as it widens, compared to the N1 array. In some examples, e.g., for simulations illustrated herein, e.g., in FIG. 3, the refractive indices for Si, SiO2, and SiN are ~3.47, ~1.444, and ~2.0, respectively.

Other examples of simulations at various points along the direction of propagation of the light are shown in FIGS. 9-22. FIGS. 9-22 show X-Y slices at various points along the Z axis, using dimensions L0, L1, and L2 as in the configuration of FIGS. 2A and 2B.

In column III, the optical axis is along the N2 waveguide.

In column IV, the optical axis is along the Si. The refractive index of Si is greater than the index of SiN, so light transfers from middle to bottom. The field is an evanescent-field transfer. Substantially all of the optical power becomes concentrated in the Si waveguide, in some examples.

In some examples, e.g., as in FIGS. 2A and 2B, right half, the N2 waveguide(s) can have substantially constant dimensions as the Si waveguide expands. In some examples, e.g., as in FIGS. 6A and 6B, the N2 waveguide(s) can taper out as the Si guide expands.

The coupler can be connected to muxes, demuxes, modulators, detectors, or other components. Examples are discussed herein, e.g., with reference to FIG. 23, active unit 2322.

Some examples include N1 and Si, but not N2, waveguides. The evanescent field decreases exponentially with distance. If no N2, the Si taper can be longer along the direction of propagation—a more gradual taper. In some examples, any number of nitride layers can be used. In some examples, the coupler can be, e.g., 100 µm-200 µm long, or <2 mm long.

Some examples are configured to reduce mode mismatch loss at interfaces between stages. At the L0/L1 interface, intermediate layer tip width less than 80 nm can make render mode mismatch loss negligible. At L2/L1 interface, width of intermediate taper of 300 nm is able to trap the mode well enough that removal of triple arm will not lead to any power loss. Also Si taper width less than 80 nm can provide that the mode is still well confined in SiN without affected by Si tip. In some examples, using a wide tip introduces an abrupt change in optical characteristics at which mode loss can occur. In some examples, in N2, tip width <80 µm leads to negligible mode mismatch loss. Similarly, narrow tips in Si can reduce mode mismatch loss.

Figure 4A:
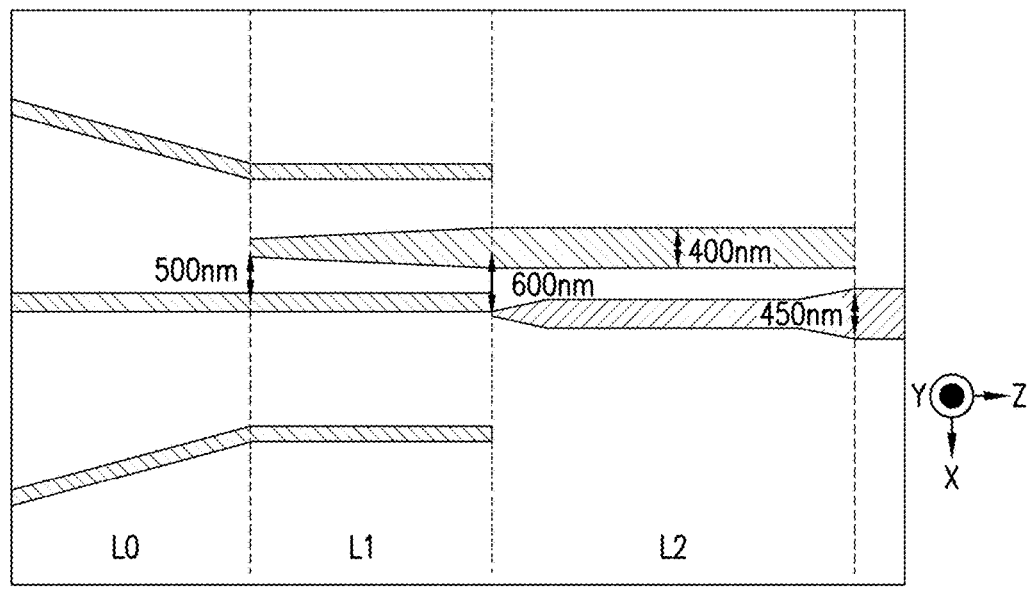
FIG. 4A shows a top view of an example optical coupler including displaced waveguides.

FIG. 4A shows an example coupler. To reduce the Si taper length, a piecewise-linear (PWL) taper with three section width expansion (tip width 60 nm→120 nm, 120 nm→200 nm transition, 200 nm→450 nm transition) is shown. The middle section takes ⅔ of Si taper length, and the initial taper and the final taper are ⅙ of the length each. Based on adiabatic mode transition, the device offers acceptable misalignment tolerance, so the intermediate SiN waveguide does not have to be exactly aligned with Si. There can also be displacement introduced in the design in order to avoid planarization steps in processing.

Figure 4B:
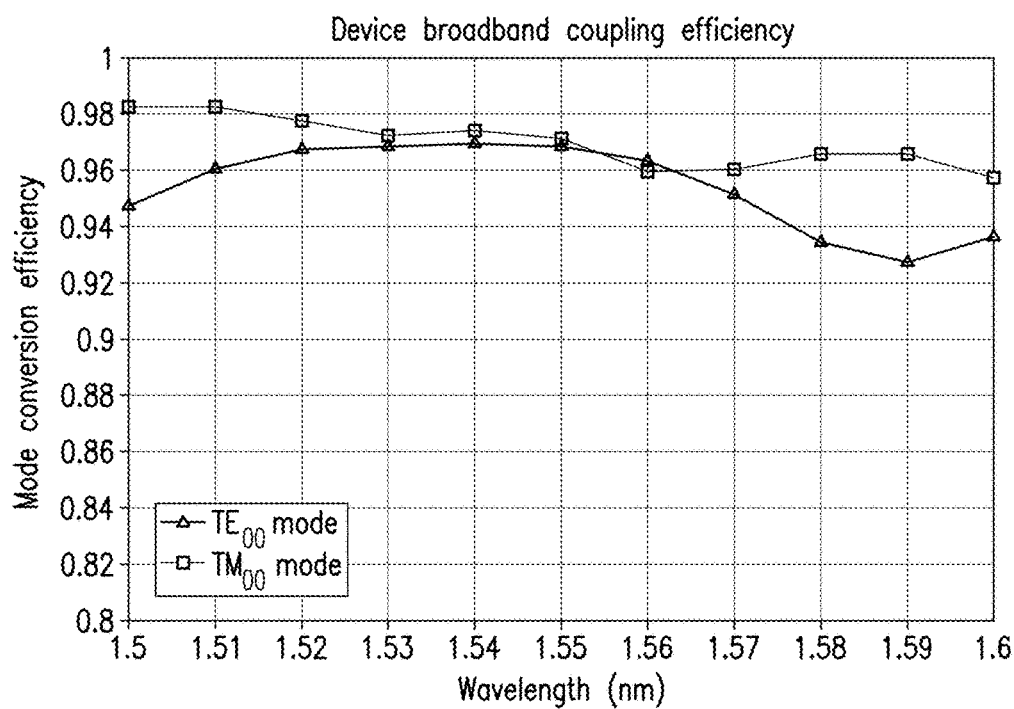
FIG. 4B shows EME simulation results of mode conversion efficiency of the design in FIG. 4A, with L0=100 μm, L1=800 μm, and L2=400 μm.

FIG. 4A shows an example design with displacement introduced, where L0=100 µm, L1=800 µm and L2=400 µm. FIG. 4B shows simulated broadband mode transition loss calculated by EME method (eigenmode expansion method), which shows at least 93% mode conversion efficiency for both polarizations. In some examples, PWL has a higher mode conversion efficiency than a straight taper at the same taper length. Mode transformation is most intense in the middle section, which expands from 120 nm to 200 nm, which is why the middle section is the longest. Some examples use a 450 nm industry-standard waveguide for single-mode operation in λ=1.5-1.6. Some examples use a waveguide thickness of 200 nm.

In some examples, e.g., FIGS. 2A-3, the N2 waveguide can be vertically aligned with the Si waveguide, e.g., the N2 waveguide and the Si waveguide can be spaced apart along a line parallel to the Y axis. In some examples, e.g., FIG. 4A, the N2 waveguide can be laterally offset from the Si waveguide, e.g., in the ±X directions. In the example of FIG. 4A, the N2 waveguide is laterally offset, and the device is operational. Moreover, some examples using lateral offset can be fabricated using planarization processes having relatively relaxed tolerances compared to examples using vertically aligned waveguides. This can permit manufacturing such devices less expensively. Lateral offset can be present between any layers. FIG. 4A shows lateral offset in the labeled X direction, but lateral offset can additionally or alternatively be present in the Y direction. Devices can be designed to operate as desired in the presence of characterized fabrication-process X or Y tolerances, or other tolerances.

Additional losses can include scattering loss and leakage through substrate. Scattering loss can be due to roughness on the sides of the tapers. Both losses can be estimated by staircasing approximation that accumulated loss equals to summation of loss from each individual propagation step (1 µm for example). For an example of the illustrated geometry with 5 nm $\sigma_{RMS}$ sidewall roughness, accumulated scattering is estimated as 0.18 dB for TE and negligible for TM while SiN taper's scattering loss can be negligible. Leakage cannot be neglected as well since there is no total internal reflection anymore to guide the mode. Si stage leakage is estimated as 0.2 dB for TM and 0.1 dB for TE, with similar amount of accumulated leakage after first two stages. Combing all sources of loss together with 0.45 dB coupling loss at facet, total fiber to chip loss for both polarization is within 1.3 dB per facet. In some examples, the coupler is as short as possible to reduce loss due to surface roughness. In some examples, the Si taper is shorter than the SiN. The SiN embedded in SiO2 has reduced scattering loss, because scattering loss is positively correlated with index difference, and n(SiN) (refractive index n of SiN) is closer to n(SiO2) than is n(Si).

In some examples, SiN taper scattering loss is negligible since SiN/SiO2 has almost 2 orders of magnitude lower scattering loss in dB than Si/SiO2. In some examples with $\sigma$rms=10 nm and a 400 µm-long taper, a linear taper can provide 2.2 dB TE loss and 0.2 dB TM loss, and a nonlinear taper can provide 0.77 dB TE loss and 0.1 dB TM loss. In some examples, scattering loss scales with $\sigma_{rms}^2$. Therefore, a device having $\sigma_{rms} \leq 5$ nm can have $\leq 0.19$ dB scattering loss for TE and $\leq 0.025$ dB for TM on a nonlinear taper. In some examples, TE leakage is lower than TM. In some examples, a mode transition of the TM component appears earlier along propagation direction (lower z position) than of the TE component. An example 400 µm-long nonlinear Si taper can have leakage of 0.31 dB for TM and 0.13 dB for TE. The L1 section can also have leakage, so total leakage can be 0.6 dB for TM and 0.3 dB for TE. Including scattering loss and leakage loss through Si substrate, an example can have TE leakage: 0.3 dB, TM leakage: 0.6 dB, TE scattering: 0.19 dB, TM scattering: 0.025 dB, resulting in total TE loss: 1.05 dB per facet and Total TM loss: 1.3 dB per facet.

Some examples are broadband. For example, as shown in FIG. 4B, a 100-nm bandwidth is available. Dimensions can be adjusted, e.g., the 450 nm of FIG. 4A, based on the wavelength of interest. In an example, a device was tested and found to be operative across a bandwidth from λ=1520 nm-1620 nm. This includes the typical telecommunications range used for optical fibers. Examples can additionally or alternatively be used in the 1310 nm band, other infrared bands, visible bands, ultraviolet bands, or other electromagnetic spectrum bands.

Figure 5:
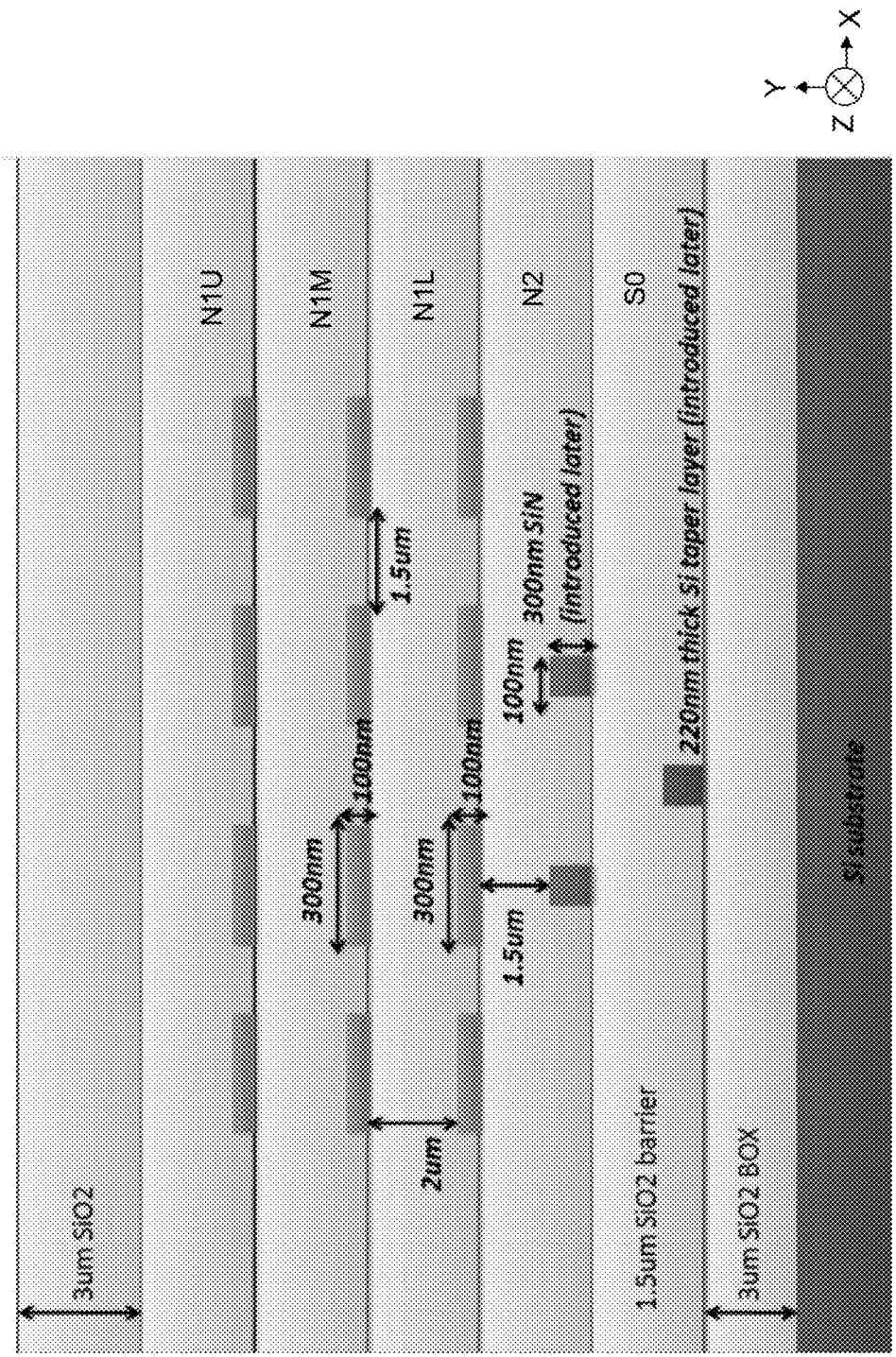
FIG. 5 shows a front (facet) view of an optical coupler using a 3×4 SiN tip matrix.

FIG. 5 shows another embodiment of a design including a 3 by 4 SiN tip matrix to guide the injected beam, with parameters given in FIG. 5. With multiple layer of SiN tip arrays, fundamental mode profile can be designed to provide effective overlap with fiber mode. The matrix can be designed to improve total coupling efficiency while reducing coupler length, and thus losses due to roughness, e.g., as discussed above.

In FIG. 5, a matrix is used for initial mode confinement. An example configuration anchors the mode to be substantially circular rather than substantially elliptical, which can reduce losses when the circular fiber mode couples into the waveguide. The array in N1U, N1M, and N1L can be sized to match the diameter of the input fiber. In some examples, n(SiN) and n(SiO2) can be different from a value used in simulating the structure, e.g., due to process variations, and the device can still function. n(Si) is generally constant because the Si is pure and monocrystalline. However, n(SiN) and n(SiO2) vary depending on deposition method. Using a matrix of SiN waveguides, the mode is spread over the matrix. Therefore, the mode is less affected by n variations in any one waveguide.

FIG. 5 shows two waveguides in N2, though any number can be used. In some examples, there can be any number of nitride layers between the matrix and the silicon.

In some examples, the matrix layers can be readily fabricated because the individual N1 segments are relatively thin. For example, using matrix N1 layers thinner than the N2 layers can permit fabricating a relatively large number of matrix layers without excessive cost, while still providing effective mode transfer via the N2 layers to the silicon waveguide.

Single mode optical fiber can support a MFD=10 um because of its low clad-to-core index contrast (e.g., Δn<0.02 between the cladding and the core). However at low index contrast, the effect of index control upon mode size variation becomes quite significant. Some examples of couplers are designed to behave in similar ways to fiber (e.g., low index contrast), in order to match modes with fiber modes and reduce loss at the fiber-coupler interface.

Figure 6A:
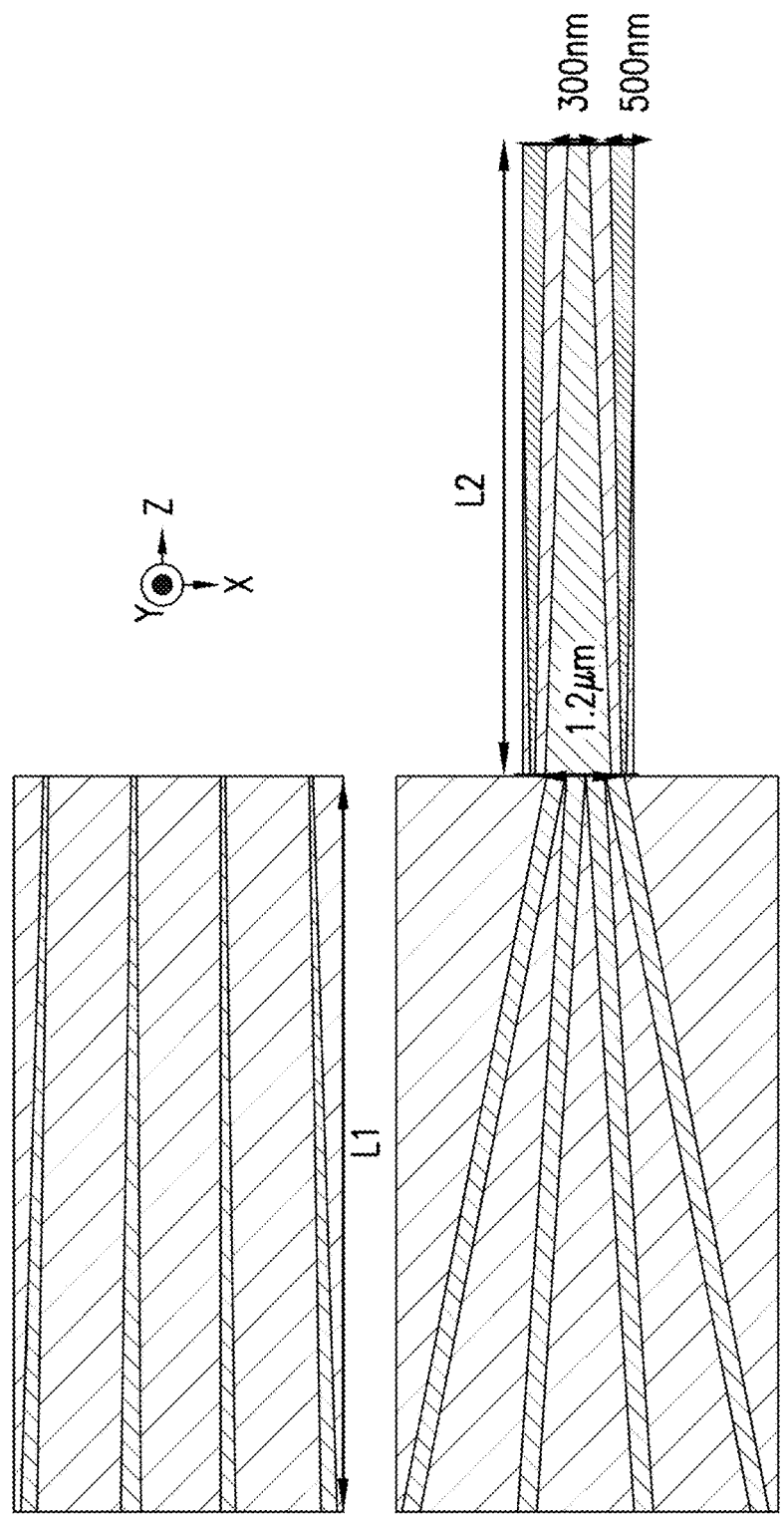
FIG. 6A shows top views of layers of an example optical coupler, including a top SiN layer (above) and Middle & bottom layers (below) that have an intermediate dual SiN taper.
Figure 6B:
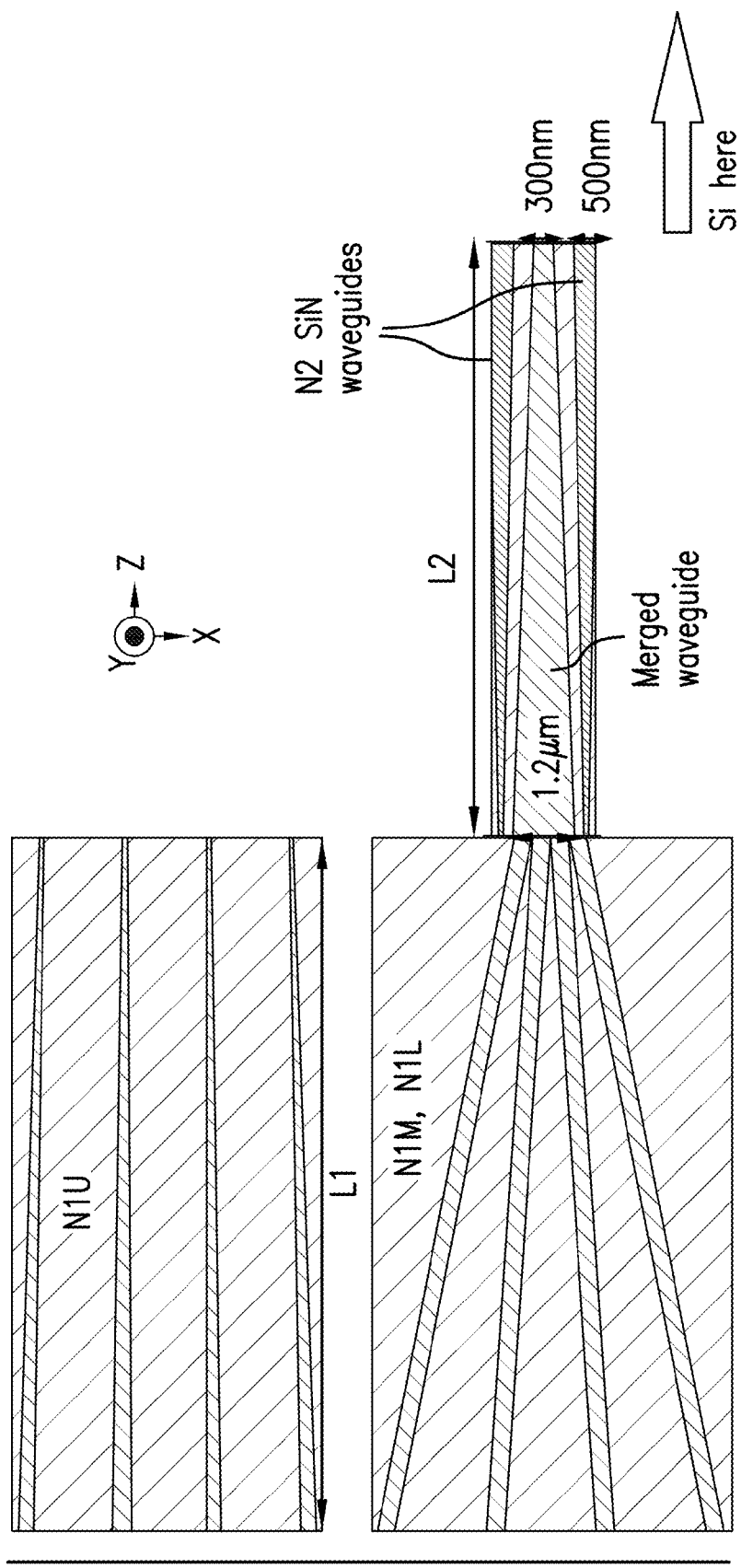
FIG. 6B shows further details of FIG. 6A.

In the example of FIG. 5, and also FIGS. 6A and 6B, the illustrated tip matrix includes very thin SiN (core) layers stacked, so the matrix occupies a relatively small volume. The low percentage SiN in the face of the matrix, e.g., the facet of the coupler, means that the refractive index in the coupler at the fiber-facing surface is just above the background index of $SiO_2$, so the structure exhibits low index contrast similar to that of optical fiber. In addition, in some examples, the tip matrix can support an almost circular mode rather than elliptical modes. The circular mode shape matches better with fiber modes than would an elliptical, flat, or rectangular mode shape, further reducing coupling loss.

FIGS. 6A and 6B show an embodiment of the design in which three layers of identical SiN tips are deployed with 2 um vertical spacing. Dimension of SiN tips are 300 nm wide and 100 nm thick, horizontally spaced by 1.5 µm. This is a nonlimiting example, and other dimensions can additionally or alternatively be used. As multiple SiN layer deposition is involved during fabrication, thickness of SiN tips is designed as thin enough (100 nm for example) to avoid planarization steps. FIGS. 6A and 6B show a top view of layers N1U, N1M, N1L, and N2 of FIG. 5. The upper plot in FIGS. 6A and 6B shows N1U; the lower plot shows N1M, N1L, and (at right) N2. The "Si here" arrow points in the longitudinal direction of the coupler, e.g., towards an active unit 2322.

Referring to FIGS. 5-6B, in some examples, at the facet, only a matrix of 3×4 SiN tips (300 nm wide and 100 nm thick) is exposed to receive incident radiation. The embedded SiN waveguides may not be able to guide the light individually, but collectively they form an almost single mode waveguide with a mode field diameter ~10 µm. After a distance L1 into the edge, a pair of 300 nm thick SiN inverse tapered waveguides begins. After another distance of L2, an Si inverse taper begins. The 3×4 SiN tips expand and pin the MFD to ~10 µm. Using a matrix of tips, the mode shape is anchored and is more robust against index variation than some prior schemes. For example, between 1500 nm and 1600 nm in an example, tip coupling efficiency is above about 95% for n=2±0.1 for SiN and n=1.45±0.05 for $SiO_2$. In most simulated examples of this design, TE efficiency >96% and TM efficiency >98%.

In N1U, the SiN waveguide reduces in width as the light travels left to right. Therefore N1U has reduced confinement capability, so forces the mode down to N1M and N1L. N1M and N1L have the same shape of SIN waveguides.

In some examples, the N2 nitrides increase in width as the N1M and N1L nitrides decrease in width. This moves the mode down to N2. In some examples, N1U tapers out and then N2 starts at the same point left-to-right.

In some examples, N1U can be used in place of N1 in FIGS. 2A and 2B, or vice versa. In some examples, FIGS. 2A and 2B N1, or N1U, M, or L in FIGS. 6A and 6B, can have any number of waveguides.

Such 3 by 4 SiN tip matrix can support $TE_{00}$ and $TM_{00}$ that overlap with fiber mode more than 98%, which is more than be achieved within one layer of multiple tips alone. Another advantage is that such mode coupling becomes fairly robust against index variation. With SiN and SiO2 index variation of 0.1, more than 95% coupling can still be obtained. Similar to previous embodiments, TM modes can experience relatively higher leakage while TE modes experience relatively higher scattering loss due to sidewall roughness. Couplers can be designed, e.g., as with examples herein, to balance the TM leakage and TE scattering loss.

Mode evolution of tip matrix provides flexibility in designing structures. Leakage suppression for example can be done by reducing horizontal gaps or widening SiN tips. This is accompanied by increment of effective refractive index (Neff) and mode localization. Mode shifting downwards can be achieved by tapering out SiN layers from top to bottom layer by layer. As top layer mode localization is gradually decreased, the layer beneath can gradually increase mode confinement capability to trap the downshifted mode. Example simulations are shown in FIGS. 9-22.

One embodiment of triple layer SiN arrays is shown in FIGS. 6A and 6B. For the top SiN layer, width of SiN tapers down to 100 nm to squeeze the mode downwards. Meanwhile middle and bottom SiN layers reduce horizontal gaps to zero. After this stage of mode evolution, mode size is reduced and position shifted downwards.

At start of stage 2(left end of "L2" arrow), top layer of SiN matrix can disappear due to absence of mode localization since mode is only confined at middle and bottom SiN layer. An additional SiN layer (300 nm thick) is introduced here at 1.5 um on top of Si taper as intermediate coupling step. An embodiment is to use dual SiN taper with expanding width to trap the mode down to intermediate layer.

Evanescent coupling shows a common trait that TM mode is more weakly confined hence coupling is more efficient than TE but also suffers higher leakage. During evolution, mode will experience a leakage peak at position where mode is most efficiently coupled down. Mode coupling process becomes most efficient during narrow range (window) of geometry change, e.g., tip-width change, while leakage peaks exactly at this window. Hence combination of both loss can be mathematically minimized or otherwise reduced at a certain length of stage 2. For example when dual Si taper (1.6 um horizontally center-to-center spaced) width expands from 100 nm to 500 nm, stage 2 length optimized at around 500 um for TM with 0.3 dB total loss.

In the area before the silicon (left of "Si here" arrow base), TE (E-field oscillations in the wafer plane) and TM (E-field oscillations perpendicular to the wafer plane) behave similarly. However, TE and TM transfer differently from N2 to Si. Some examples are designed to provide increased efficiency for TE compared to TM, or vice versa.

In some examples, the tips of the matrix waveguides can be offset from each other in Z, e.g., increasingly to the right as you move down the stack towards the substrate.

Figure 7:
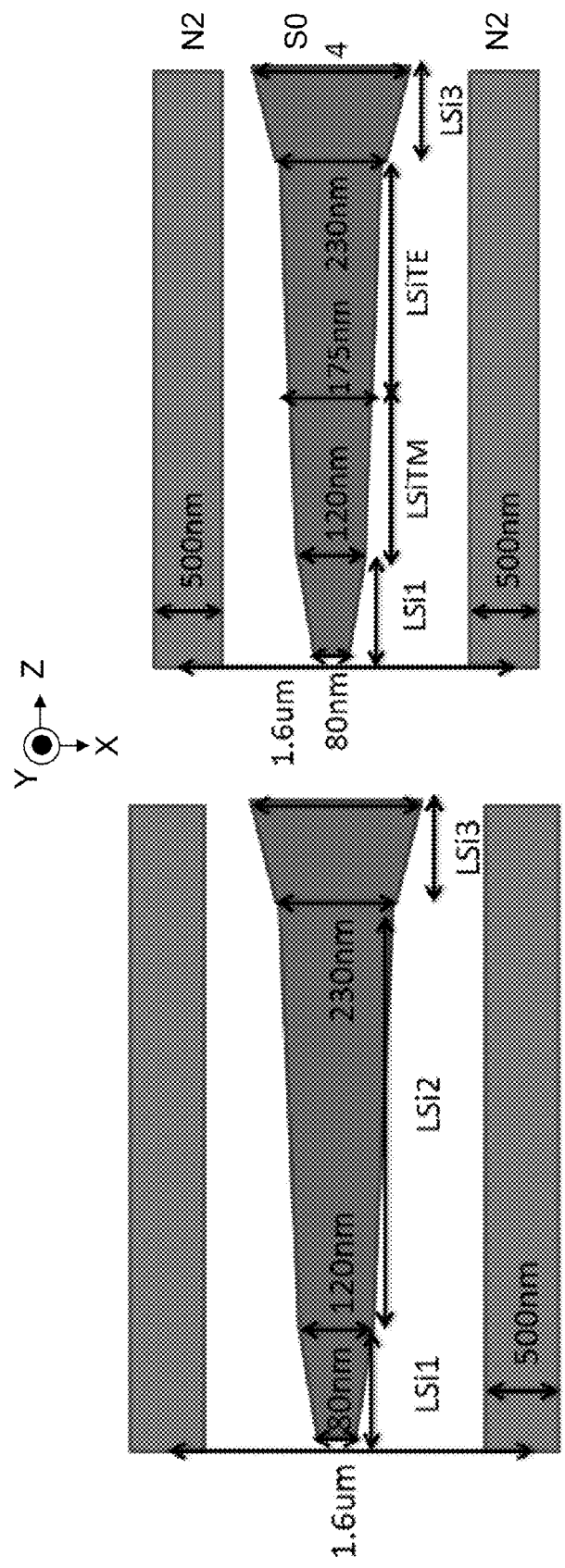
FIG. 7 shows top views of a stage 3 optical coupler design with (left) 3 section and (right) 4 section piecewise linear shape, including straight SiN and tapered Si.

FIG. 7, left side, shows an example taper that can be used to the right of the portions of the coupler shown in FIGS. 6A and 6B. Last stage is the mode coupling from dual SiN waveguide down to Si taper. Si taper hence can be designed as piecewise linear as shown in FIG. 7 (similar to FIGS. 2A and 2B), where the main guideline is to assign the majority of taper length to where mode transition is most drastic. However same problem will still arise that TM is more efficient in terms of coupling yet also suffering high leakage. As a result if during design mode conversion efficiency of TE is guaranteed, redundant taper length will be required for TM coupling which ultimately builds up considerable leakage loss. As mode is localized very close to Si substrate at this stage, TM becomes more susceptible to leakage which requires cautious design.

FIG. 7, right side, represents a design in which a mode sorter was used to determine where the TM and TE crossover occurs. The lengths of the TE and TM segments can be set individually. For example, the TE segment can be longer to provide reduced coupling loss.

Some examples herein offer more balanced results for both polarization. One group of examples is to divide the main body of the taper into TM and TE part. As shown in FIG. 7, right side, the Si taper becomes 4 section piecewise linear. Assigning longer taper length to TE transition than TM can get more balanced mode conversion loss.

Figure 8A:
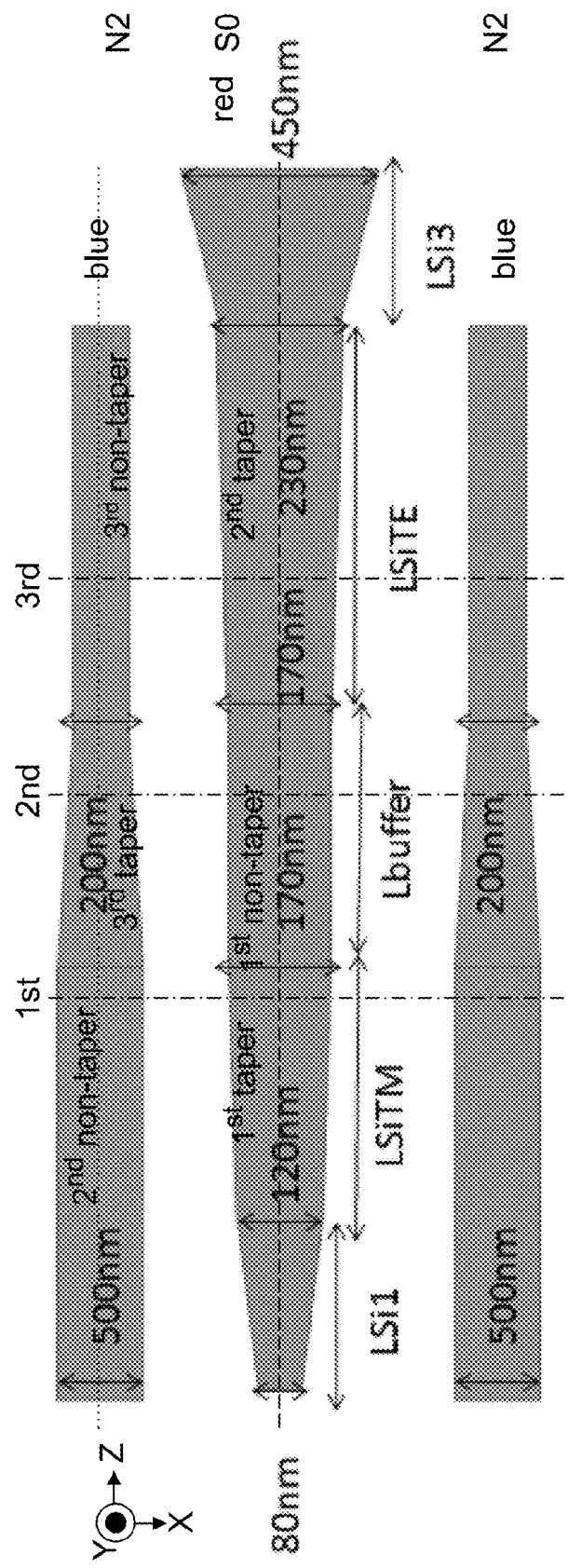
FIG. 8A shows another example of a stage 3 optical coupler design having a buffering region.
Figure 8B:
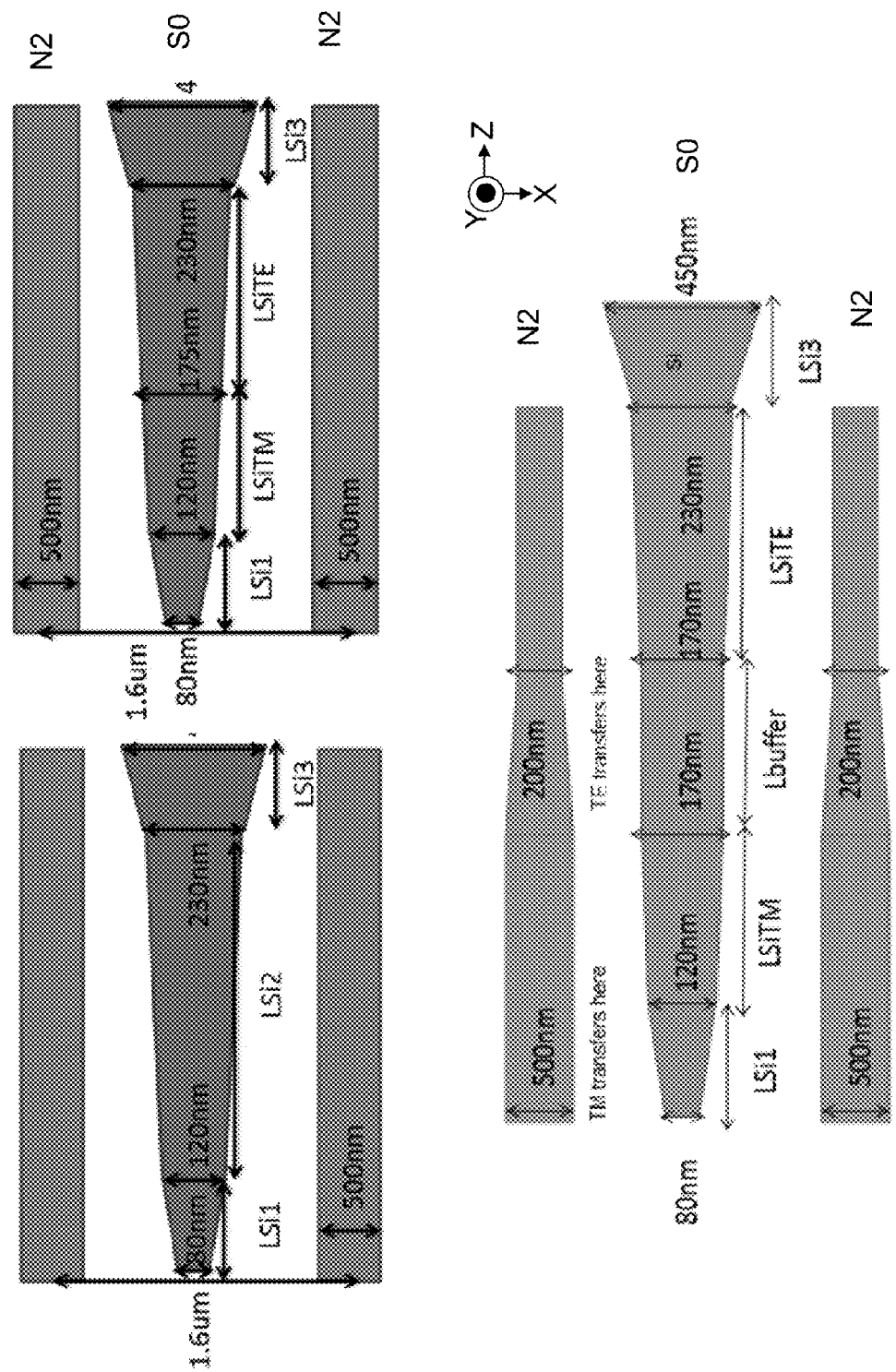
FIG. 8B shows further details of FIGS. 7 and 8A.
Figure 9:
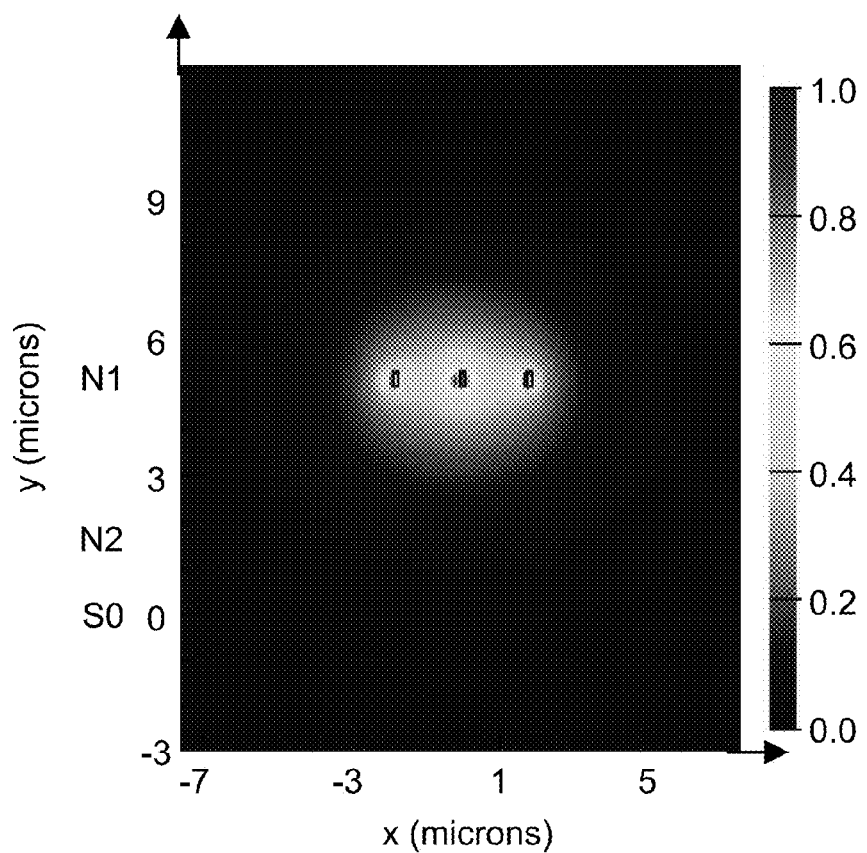
FIG. 9 shows simulation results indicating the magnitude of the electric field in an example optical coupler at Z=0 for TE illumination.
Figure 9:
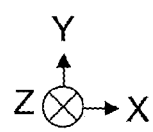
Figure 10:
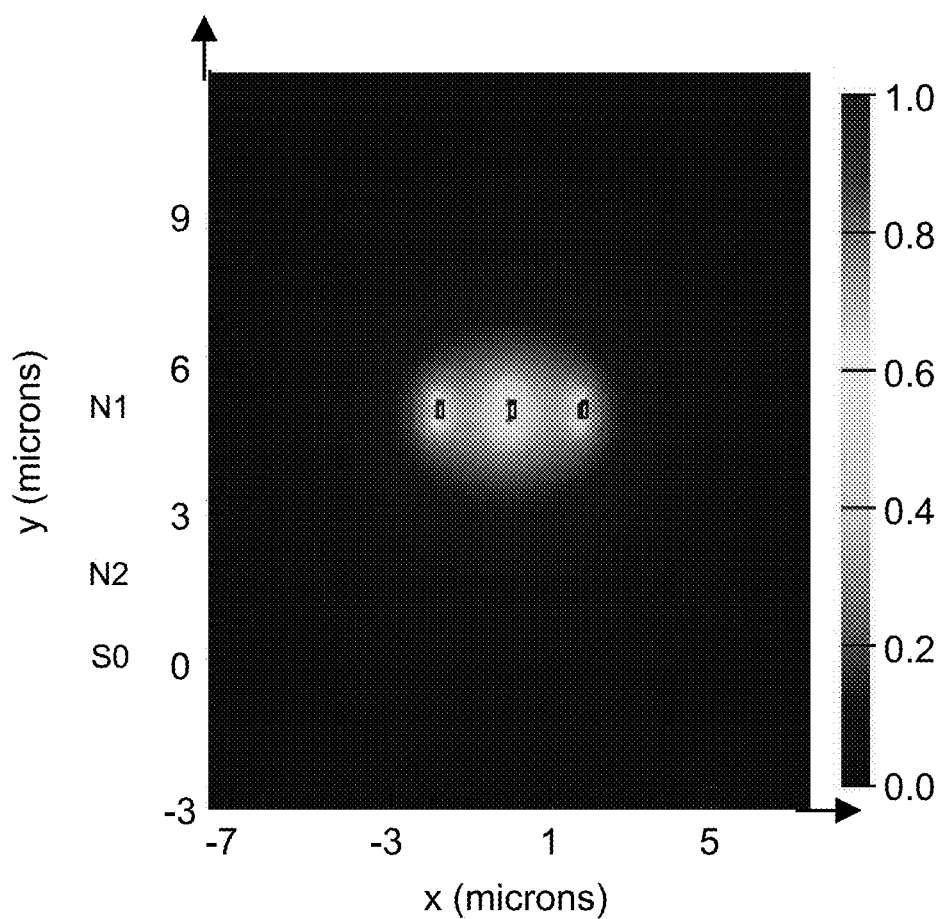
FIG. 10 shows simulation results indicating the magnitude of the electric field in an example optical coupler at Z=0 for TM illumination.
Figure 10:
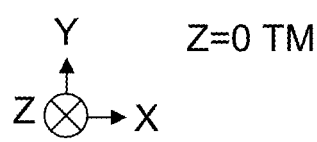
Figure 11:
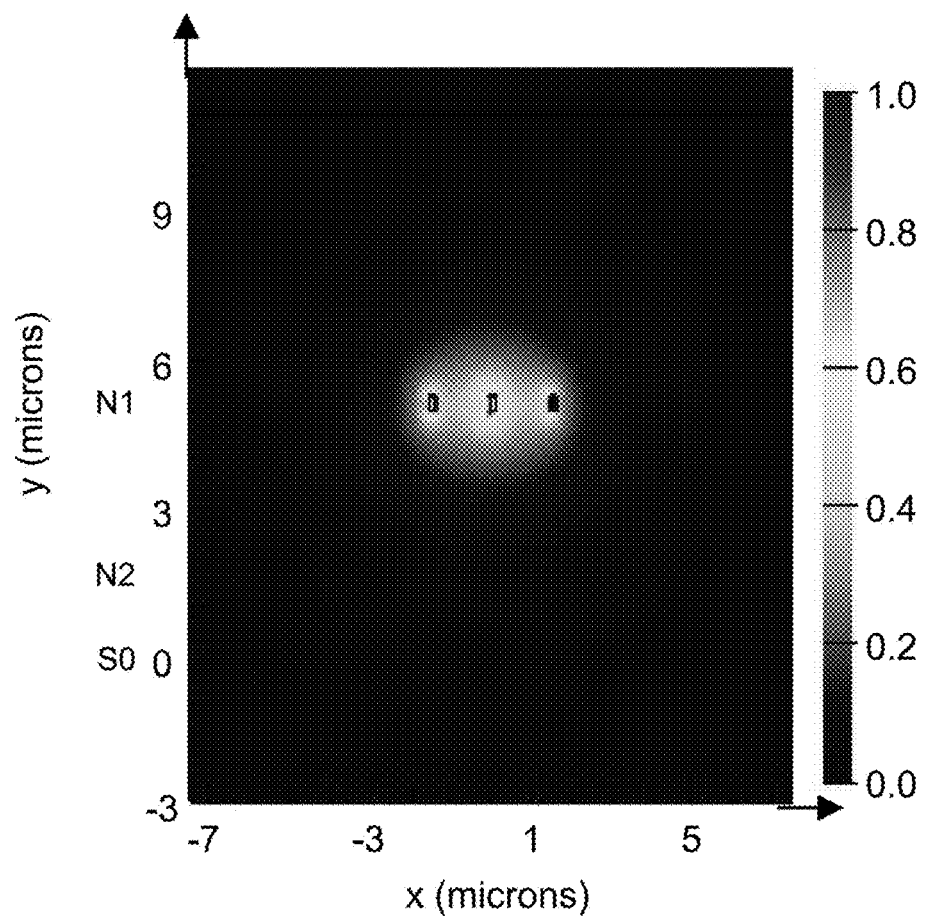
FIG. 11 shows simulation results indicating the magnitude of the electric field in an example optical coupler at Z=0.5 $L_0$ for TE illumination.
Figure 11:
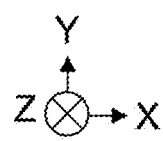
Figure 12:
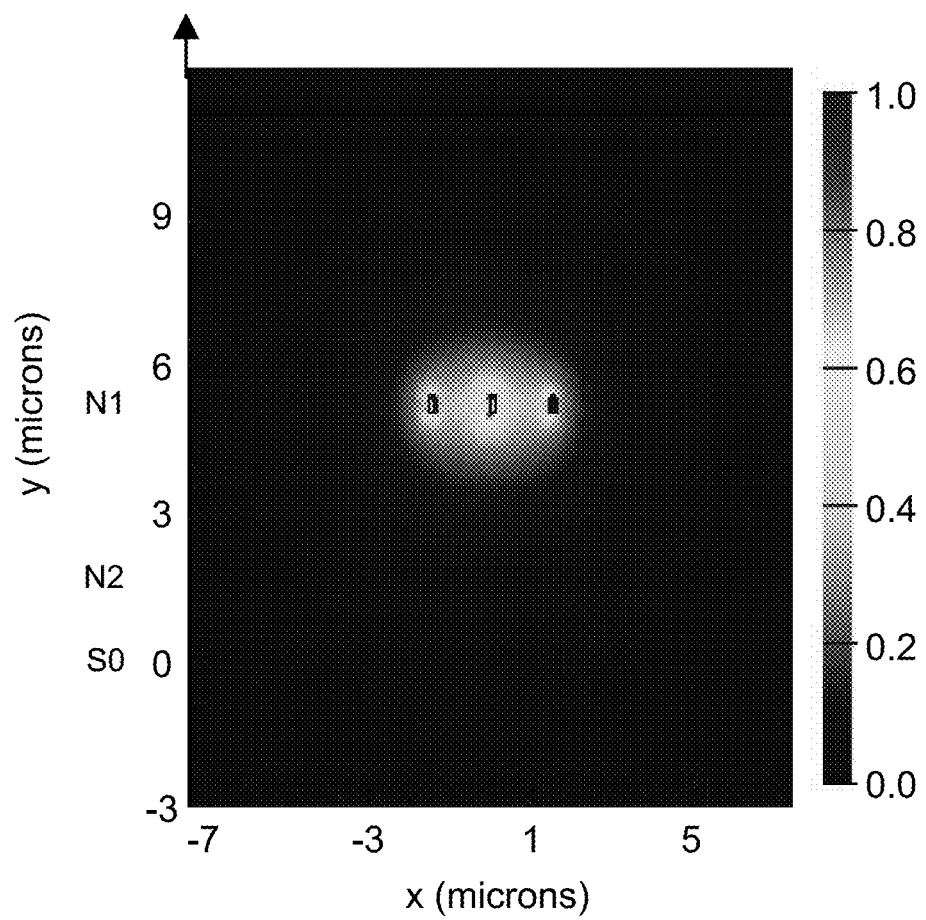
FIG. 12 shows simulation results indicating the magnitude of the electric field in an example optical coupler at Z=0.5 $L_0$ for TM illumination.
Figure 12:
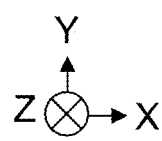
Figure 13:
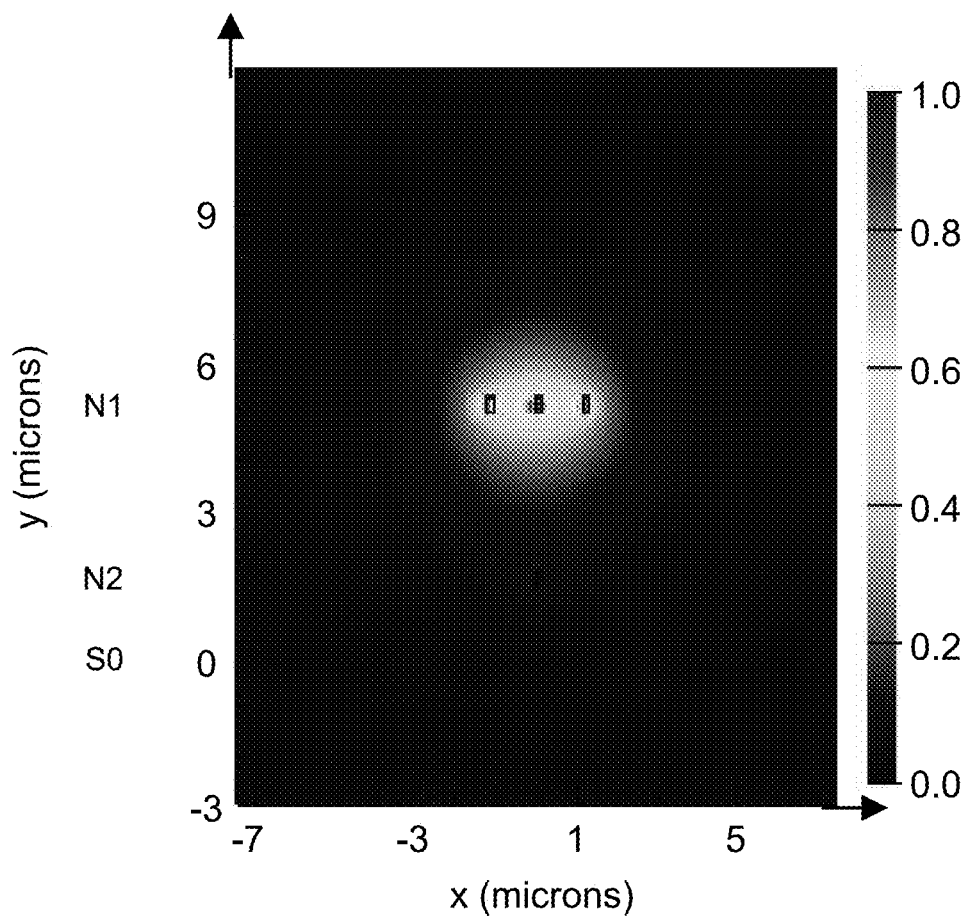
FIG. 13 shows simulation results indicating the magnitude of the electric field in an example optical coupler at Z=$L_0$ for TE illumination.
Figure 13:
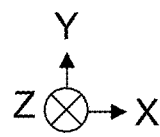
Figure 14:
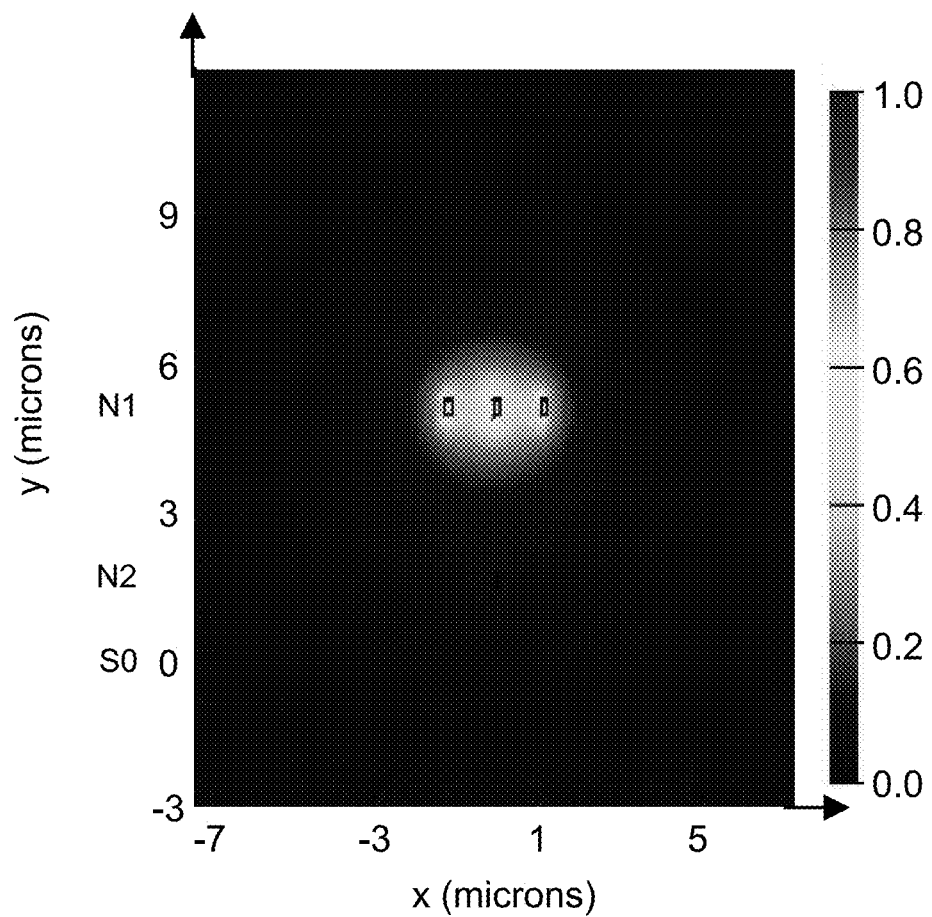
FIG. 14 shows simulation results indicating the magnitude of the electric field in an example optical coupler at Z=$L_0$ for TM illumination.
Figure 14:
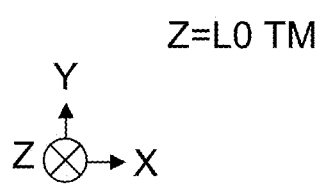
Figure 15:
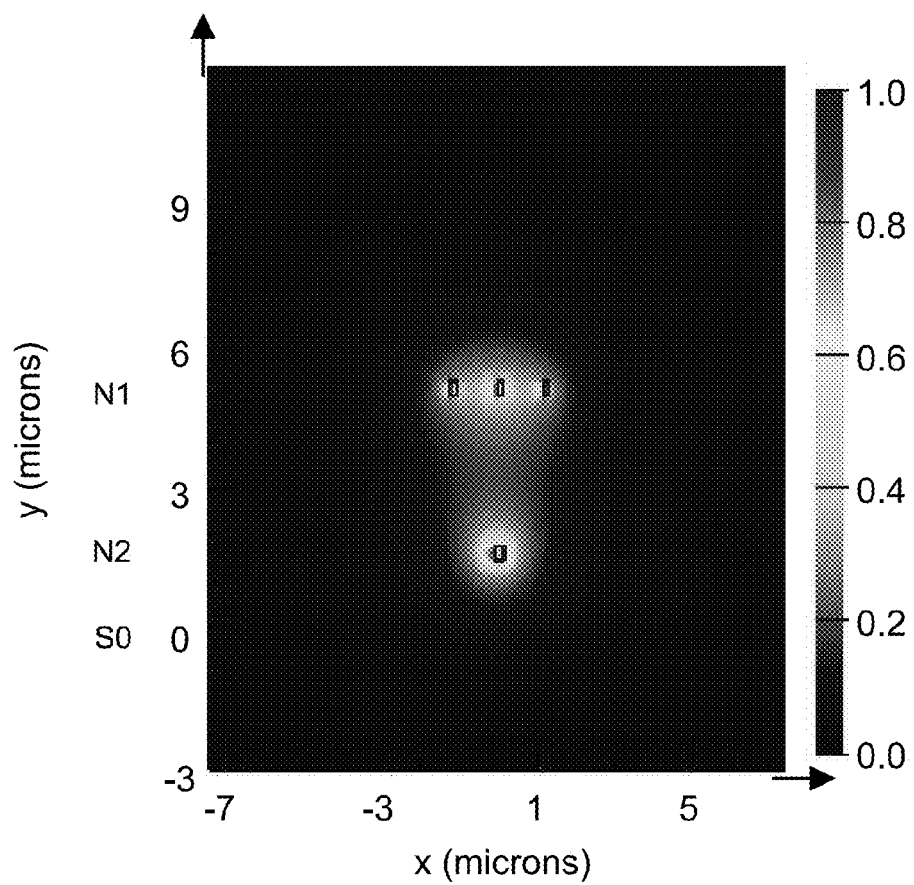
FIG. 15 shows simulation results indicating the magnitude of the electric field in an example optical coupler at Z=$L_0$+0.5 $L_1$ for TE illumination.
Figure 15:
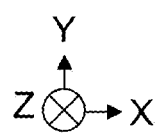
Figure 16:
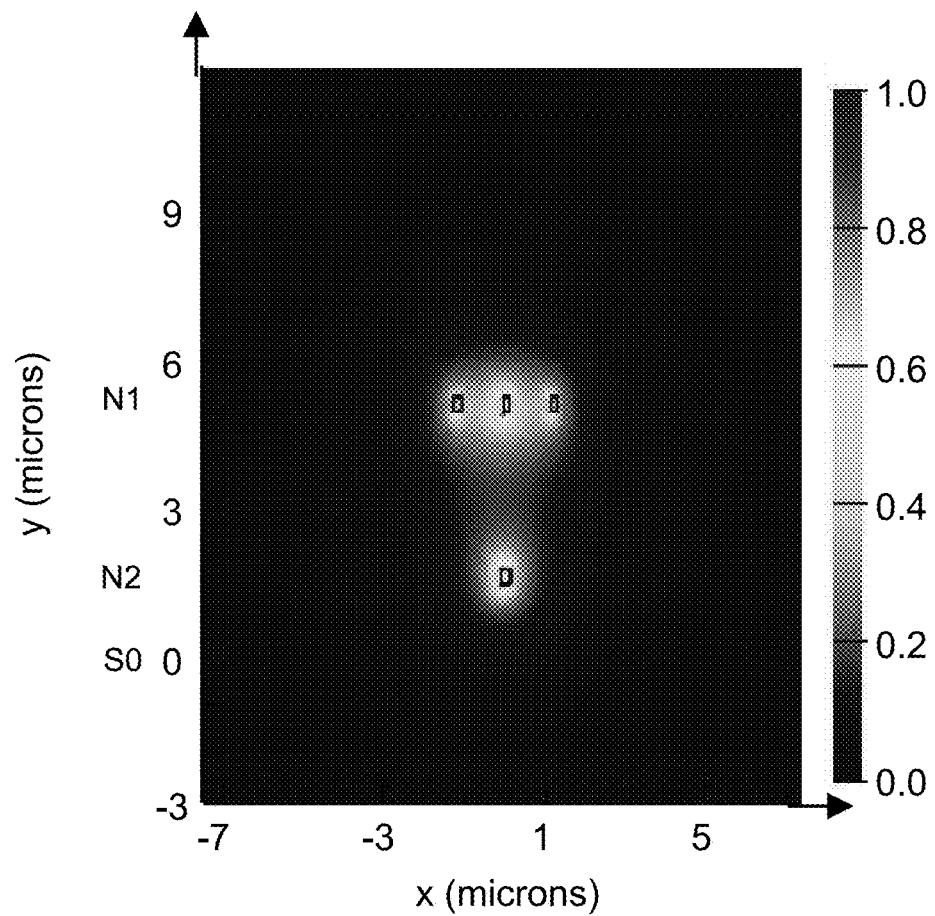
FIG. 16 shows simulation results indicating the magnitude of the electric field in an example optical coupler at Z=$L_0$+0.5 $L_1$ for TM illumination.
Figure 16:
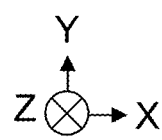
Figure 17:
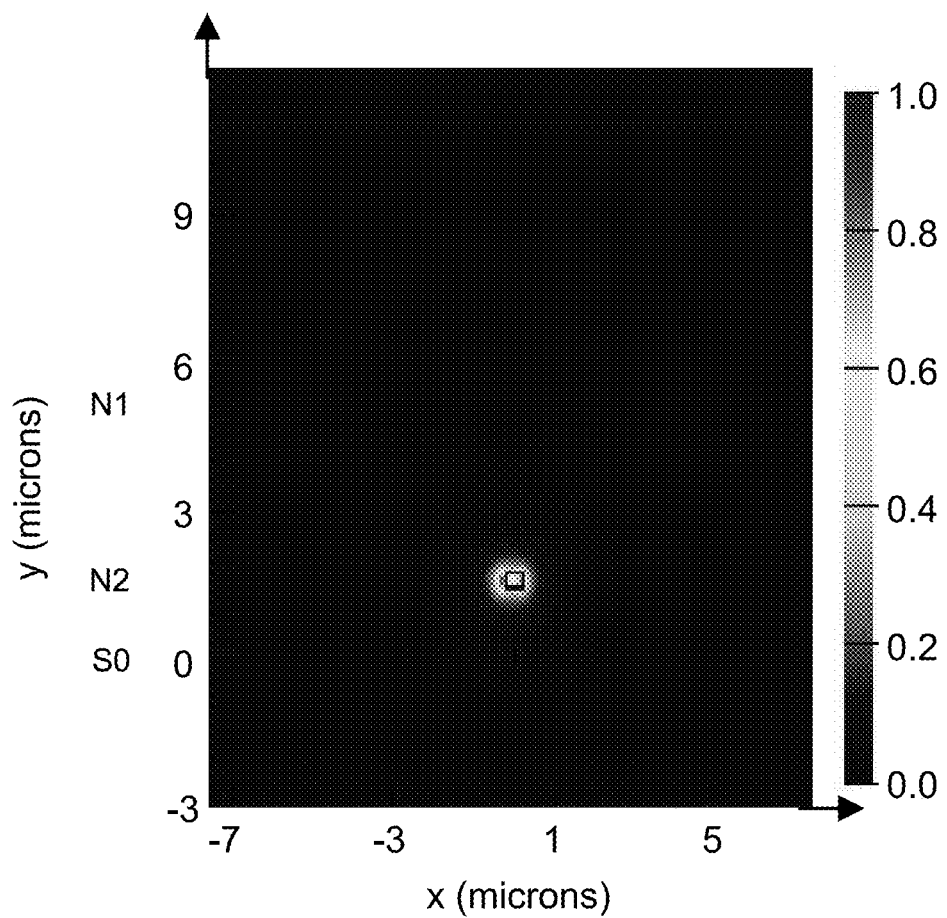
FIG. 17 shows simulation results indicating the magnitude of the electric field in an example optical coupler at Z=$L_0$+$L_1$ for TE illumination.
Figure 17:
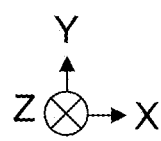
Figure 18:
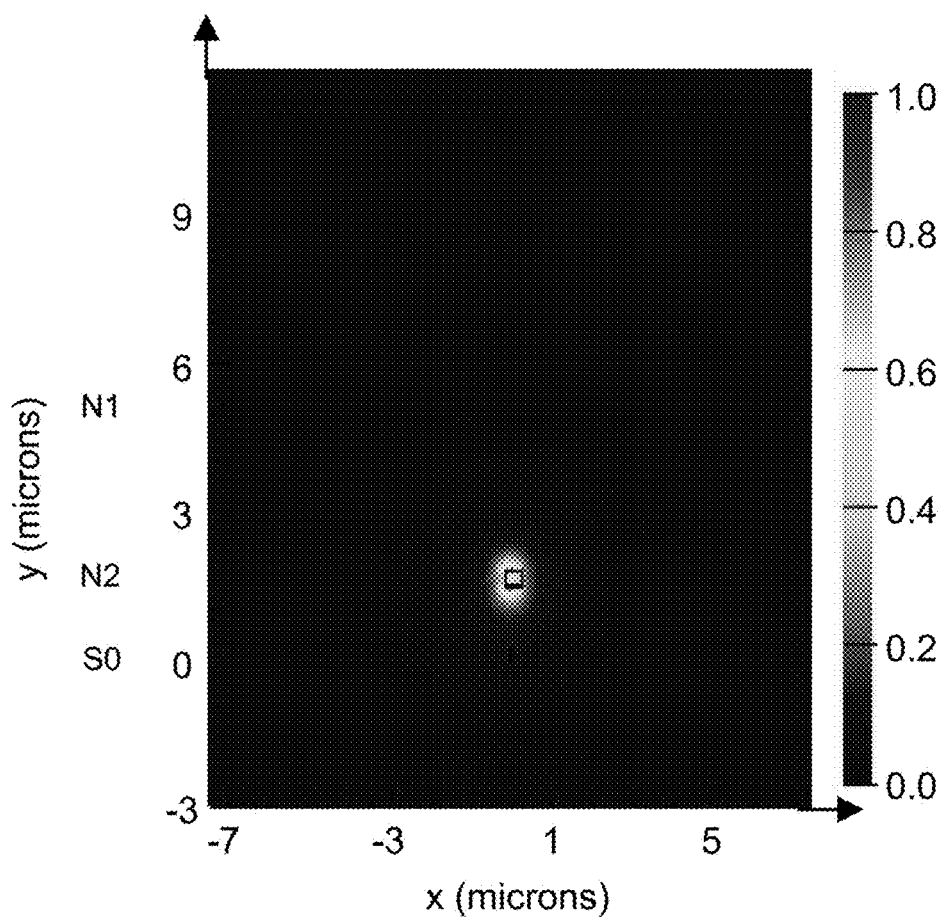
FIG. 18 shows simulation results indicating the magnitude of the electric field in an example optical coupler at Z=$L_0$+$L_1$ for TM illumination.
Figure 18:
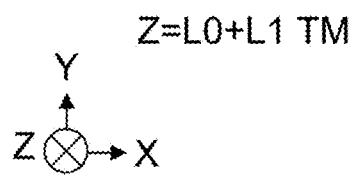
Figure 19:
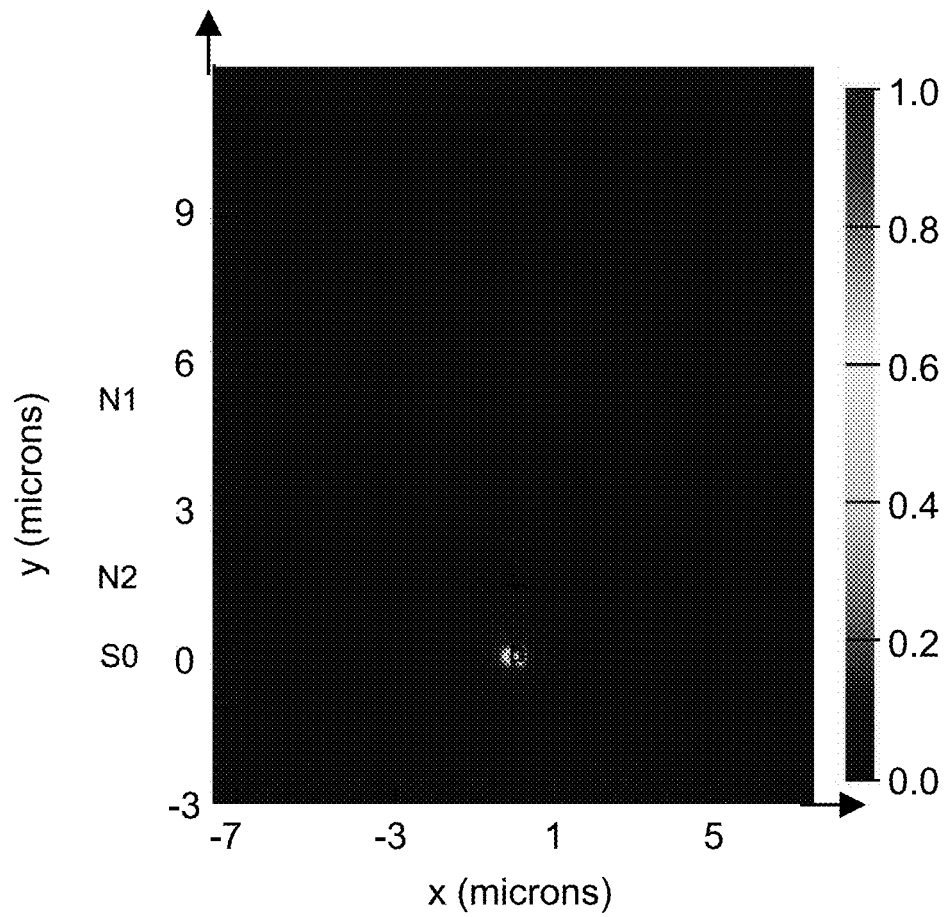
FIG. 19 shows simulation results indicating the magnitude of the electric field in an example optical coupler at Z=$L_0$+$L_1$+0.5 $L_2$ for TE illumination.
Figure 19:
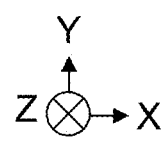
Figure 20:
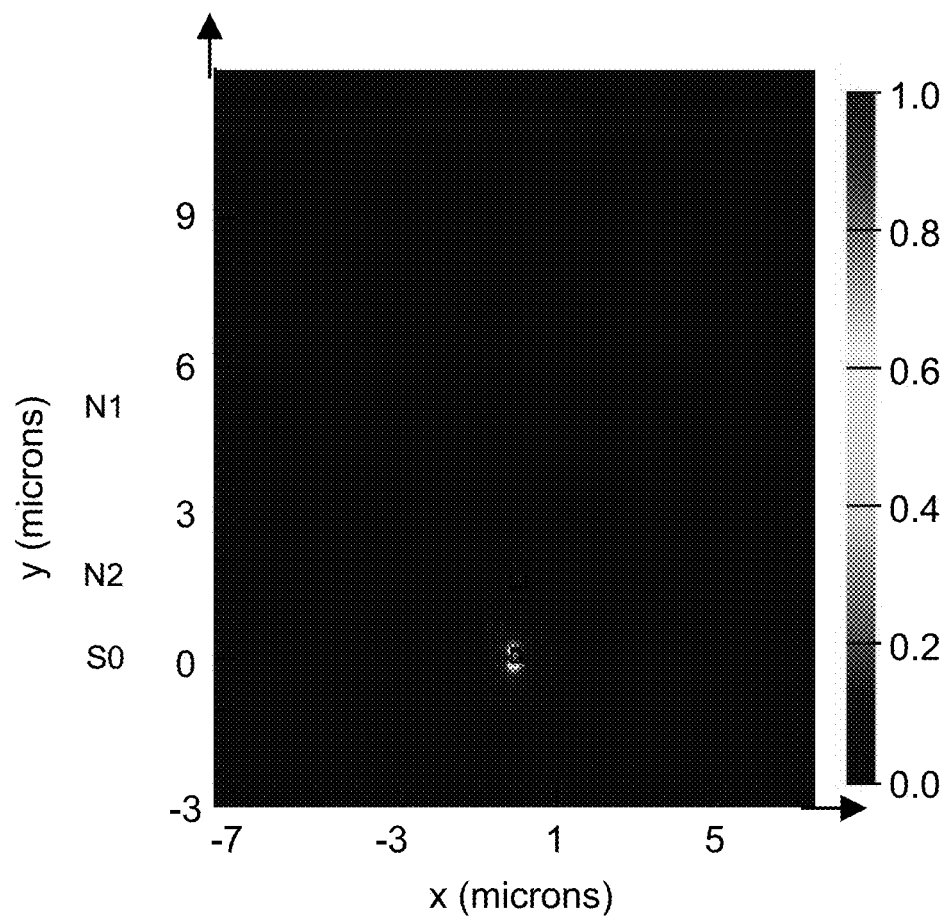
FIG. 20 shows simulation results indicating the magnitude of the electric field in an example optical coupler at Z=$L_0$+$L_1$+0.5 $L_2$ for TM illumination.
Figure 20:
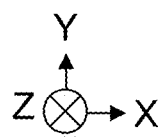
Figure 21:
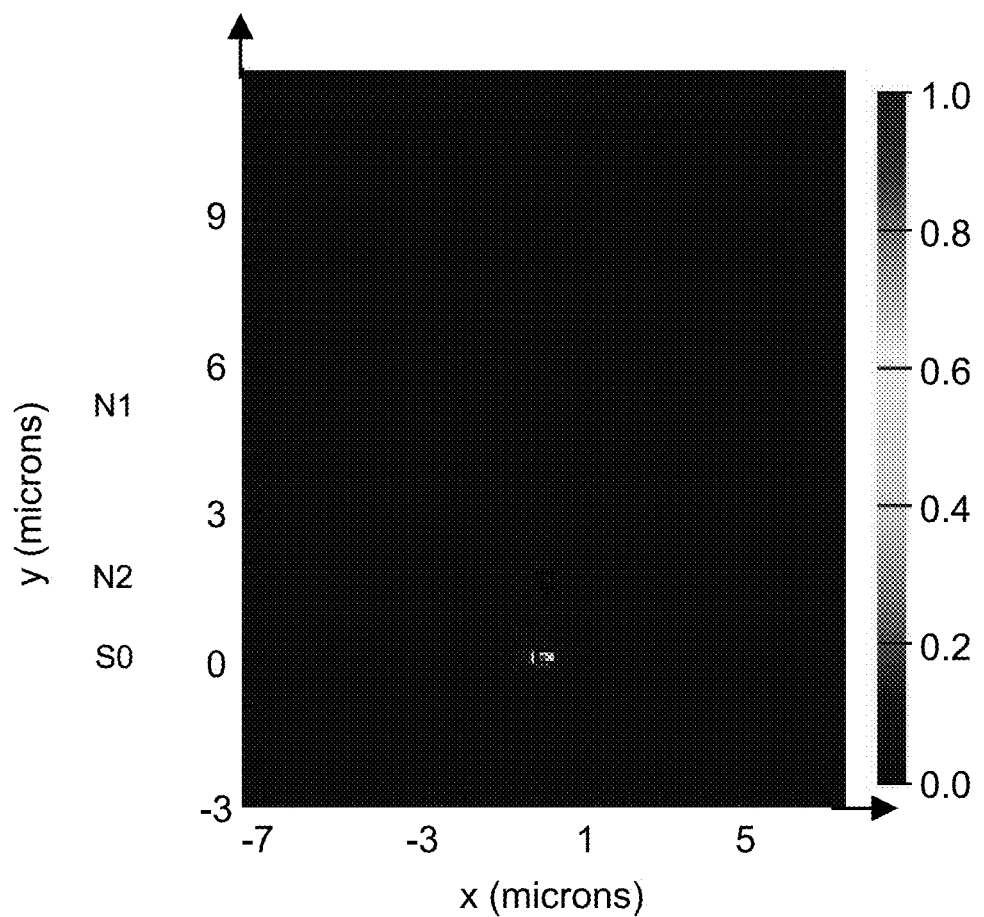
FIG. 21 shows simulation results indicating the magnitude of the electric field in an example optical coupler at Z=$L_0$+$L_1$+$L_2$ for TE illumination.
Figure 21:
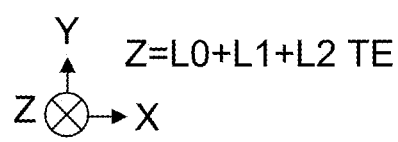
Figure 22:
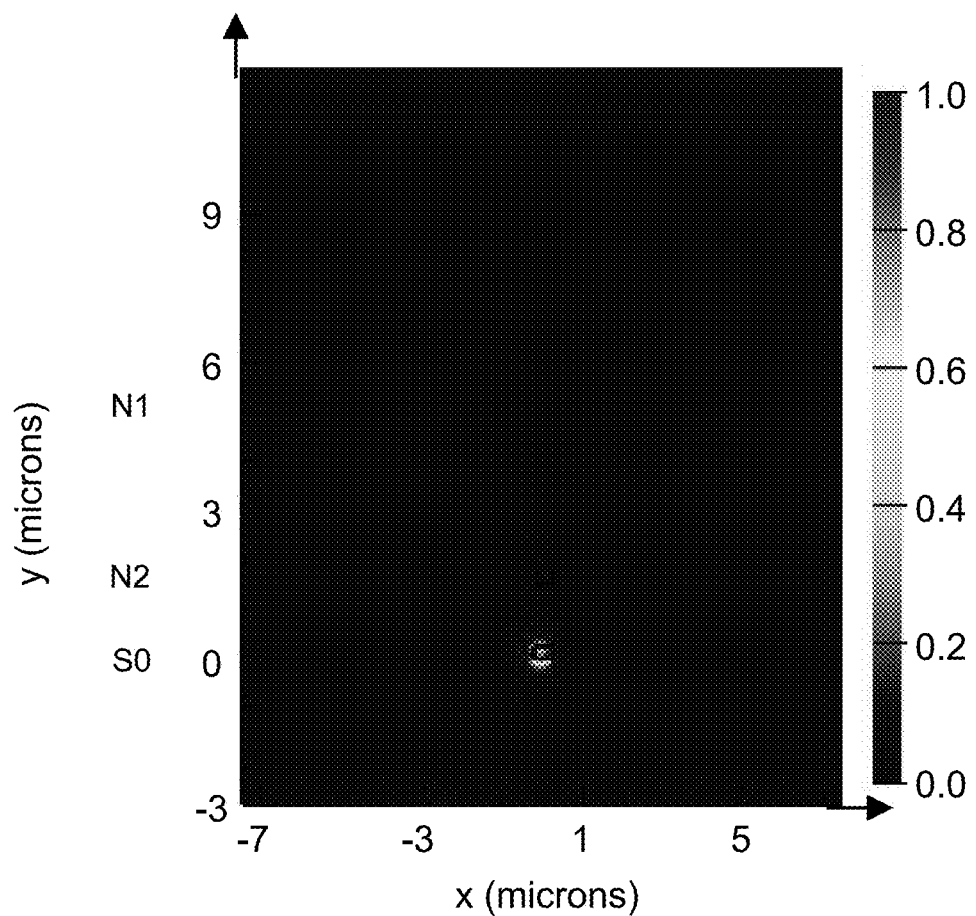
FIG. 22 shows simulation results indicating the magnitude of the electric field in an example optical coupler at Z=$L_0$+$L_1$+$L_2$ for TM illumination.
Figure 22:
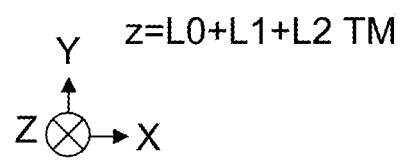

FIGS. 8A and 8B show another group of examples, in which only one of N2 and Si is tapering at any given location along the left-to-right axis. An alternative method is to taper down the intermediate dual SiN width to delocalize the mode for better evanescent coupling. However releasing the trapped mode is detrimental for TM since TM leakage will be even higher. However, TM mode suffers less mode transition loss and scattering loss than TE mode.

In FIGS. 8A and 8B, for the TM portion of the Si taper, wider SiN waveguides permit leakage to remain low. There is a short buffering stage immediately after TM window, mode delocalization at dual SiN waveguides will have no more effect on TM leakage. Although TE leakage becomes higher, evanescent coupling also becomes much easier. With parameters shown in FIGS. 8A and 8B, both polarization has about 0.13 dB mode conversion efficiency and 0.15 dB leakage.

When the N2 width is 500 nm, TM is transferred more effectively to Si than TE. However, TE generally remains in the waveguide. Tapering N2 narrower squeezes TE out to the silicon. This can permit one coupler to operate efficiently for both TE and TM. In some examples, using a wider N2 segment before narrowing to 200 nm reduces optical loss to the substrate of the TM modes, compared to narrowing at the beginning (left end) of the N2 waveguides. This is because the evanescent coupling of TM waveguide is easier than the same for TE, but this can increase leakage loss. FIGS. 6A and 6B manage those losses to provide effective TE and TM coupling.

Scattering loss for SiN parts can be negligible while for Si taper while Si taper scattering loss is around 0.2 dB for 5 nm $\sigma_{RMS}$ sidewall roughness. Combing fiber coupling loss, mode transition loss, scattering as well as leakage, total fiber-to-chip loss is around 1.1 dB for both polarization.

In an example of FIG. 8A, With Lsi1=50 μm=LSi3 and LSiTM=100 μm=Lbuffer=LSiTE, both TE and TM show ~0.13 dB mode conversion loss and ~0.15 dB leakage. Stage 3 can couple light from the intermediate SiN (e.g., N2) to Si inverse taper (e.g., S0). In some examples, TE coupling is less efficient than TM but TM leakage is higher than TE. Therefore, in some of these examples, the waveguides are shaped to more rapidly couple TM into Si but let TE stay in SiN during that process. In an example of FIG. 8A, TM transition occurs at 120 nm-170 nm Si width expansion (TM window) and TE at 170 nm-230 nm (TE window). A short TM taper first couples TM light into Si, where leakage will be relatively small. Tapering down the width of dual intermediate SiN waveguides to release the TE mode enhances evanescent coupling for TE, but may increase TE leakage. Therefore, a TE taper in Si is used to absorb the remaining TE portion of incident light.

In an example, scattering loss for SiN waveguides can be negligible. In some examples, scattering loss of an Si taper with a 5 nm $\sigma_{RMS}$ sidewall roughness, scattering loss can be ~0.2 dB for TE and negligible for TM. For 250 μm-long stage 1, 600 μm stage 2, and 400 μm stage 3, mode conversion efficiency can be ≥~93%. Thus total mode transition loss after three stages can be ~0.31 dB.

In view of the foregoing, various aspects provide an optical coupler that can, e.g., effectively couple optical energy between a single-mode optical fiber and a silicon waveguide on an integrated circuit (IC). A technical effect is to gradually expand or contract the mode field diameter, depending on the direction of propagation.

Figure 23:
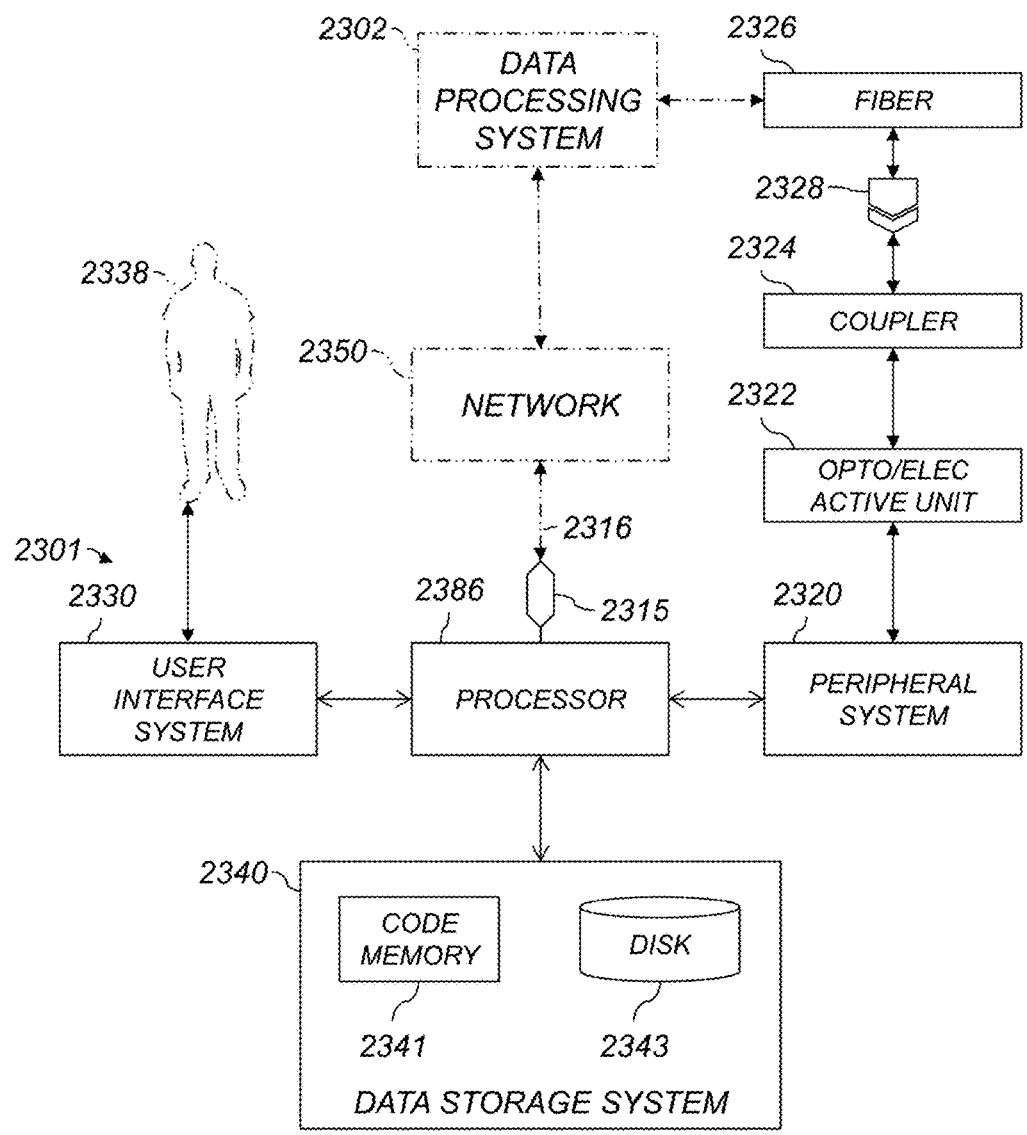
FIG. 23 is a high-level diagram showing the components of a data-processing system.

FIG. 23 is a high-level diagram showing the components of an example data-processing system 2301 for analyzing data and performing other analyses described herein, and related components. The system 2301 includes a processor 2386, a peripheral system 2320, a user interface system 2330, and a data storage system 2340. The peripheral system 2320, the user interface system 2330, and the data storage system 2340 are communicatively connected to the processor 2386. Processor 2386 can be communicatively connected to network 2350 (shown in phantom), e.g., the Internet or a leased line, as discussed below. Systems 2301 and 2302 can each include one or more optical couplers as described herein, or one or more of systems 2386, 2320, 2330, 2340, and can each connect to one or more network(s) 2350. Processor 2386, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 2386 can implement processes of various aspects described herein. Processor 2386 and related components can, e.g., carry out processes for transmitting or receiving data by optical-electronic conversion. For example, processor 2386 can operate a photodiode to receive data via an optical coupler as described herein, or can operate a laser diode to transmit data via an optical coupler as described herein.

Processor 2386 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 2320, user interface system 2330, and data storage system 2340 are shown separately from the processor 2386 but can be stored completely or partially within the processor 2386.

The peripheral system 2320 can include or be communicatively connected with one or more devices configured or otherwise adapted to provide digital content records to the processor 2386 or to take action in response to processor 186. For example, the peripheral system 2320 can include digital still cameras, digital video cameras, cellular phones, or other data processors. The processor 2386, upon receipt of digital content records from a device in the peripheral system 2320, can store such digital content records in the data storage system 2340.

The user interface system 2330 can convey information in either direction, or in both directions, between a user 2338 and the processor 2386 or other components of system 2301. The user interface system 2330 can include a mouse, a keyboard, another computer (connected, e.g., via a network or a null-modem cable), or any device or combination of devices from which data is input to the processor 2386. The user interface system 2330 also can include a display device, a processor-accessible memory, or any device or combination of devices to which data is output by the processor 2386. The user interface system 2330 and the data storage system 2340 can share a processor-accessible memory.

In various aspects, processor 2386 includes or is connected to communication interface 2315 that is coupled via network link 2316 (shown in phantom) to network 2350. For example, communication interface 2315 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Communication interface 2315 sends and receives electrical, electromagnetic, or optical signals that carry digital or analog data streams representing various types of information across network link 2316 to network 2350. Network link 2316 can be connected to network 2350 via a switch, gateway, hub, router, or other networking device.

In various aspects, system 2301 can communicate, e.g., via network 2350, with a data processing system 2302, which can include the same types of components as system 2301 but is not required to be identical thereto. Systems 2301, 2302 can be communicatively connected via the network 2350. Each system 2301, 2302 can execute computer program instructions to transmit or receive data optically.

Processor 2386 can send messages and receive data, including program code, through network 2350, network link 2316, and communication interface 2315. For example, a server can store requested code for an application program (e.g., a JAVA applet) on a tangible non-volatile computer-readable storage medium to which it is connected. The server can retrieve the code from the medium and transmit it through network 2350 to communication interface 2315. The received code can be executed by processor 2386 as it is received, or stored in data storage system 2340 for later execution.

Data storage system 2340 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 2386 can transfer data (using appropriate components of peripheral system 2320), whether volatile or nonvolatile; removable or fixed; electronic, magnetic, optical, chemical, mechanical, or otherwise. Example processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 2340 can be a tangible non-transitory computer-readable storage medium, i.e., a non-transitory device or article of manufacture that participates in storing instructions that can be provided to processor 2386 for execution.

In an example, data storage system 2340 includes code memory 2341, e.g., a RAM, and disk 2343, e.g., a tangible computer-readable rotational storage device or medium such as a hard drive. Computer program instructions are read into code memory 2341 from disk 2343. Processor 2386 then executes one or more sequences of the computer program instructions loaded into code memory 2341, as a result performing process steps described herein. In this way, processor 2386 carries out a computer implemented process. For example, steps of methods described herein, blocks of the flowchart illustrations or block diagrams herein, and combinations of those, can be implemented by computer program instructions. Code memory 2341 can also store data, or can store only code.

Various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 2386 (and possibly also other processors), and that, when loaded into processor 2386, cause functions, acts, or operational steps of various aspects herein to be performed by processor 2386 (or other processor). Computer program code for carrying out operations for various aspects described herein may be written in any combination of one or more programming language(s), and can be loaded from disk 2343 into code memory 2341 for execution. The program code may execute, e.g., entirely on processor 2386, partly on processor 2386 and partly on a remote computer connected to network 2350, or entirely on the remote computer.

In some examples, peripheral system 2320 can include or be connected to at least one optical or electronic active unit 2322 ("opto/elec active unit"). The active unit 2322 can include, e.g., at least one of any of the following optical components or electronic components: lenses, mirrors, or gratings; microelectromechanical systems (MEMS) devices or structures such as movable micromirrors, resonators, or oscillators; photodiodes, photomultiplier circuits (solid-state, tube, or otherwise), or other optical-to-electronic conversion devices; light-emitting diodes (LEDs); lasers such as in-plane, vertically-emitting, or other laser diodes, or other semiconductor lasers, solid, liquid, or gas lasers, or other electronic-to-optical conversion devices.

In some examples, a peripheral system 2320 can include or be connected to at least one coupler 2324, e.g., as discussed herein with reference to FIG. 1-8B or 24-27.

In some examples, the coupler 2324 can be connected to an optical fiber 2326, e.g., via a connector 2328. Connector 2328 can include, e.g., a screw or snap connector such as an FC, LC, or MIC connector. A splice can be used in addition to or instead of connector 2328. In the illustrated example, optical fiber 2326 can be a networking fiber communicatively connected to system 2302, but this is not limiting. In some examples, the coupler 2324 can be connected to an optical fiber 2326 via a splice. For example, the coupler 2324 can be arranged at a facet 2712 and a cleaved end of optical fiber 2326 can be butted up against the facet 2712 or otherwise disposed proximal to facet 2712.

Coupler 2324 can convey light (electromagnetic fields) between optical fiber 2326 and active unit 2322, e.g., light transmitted from system 2301, light transmitted to system 2301, or light in either direction.

Figure 24:
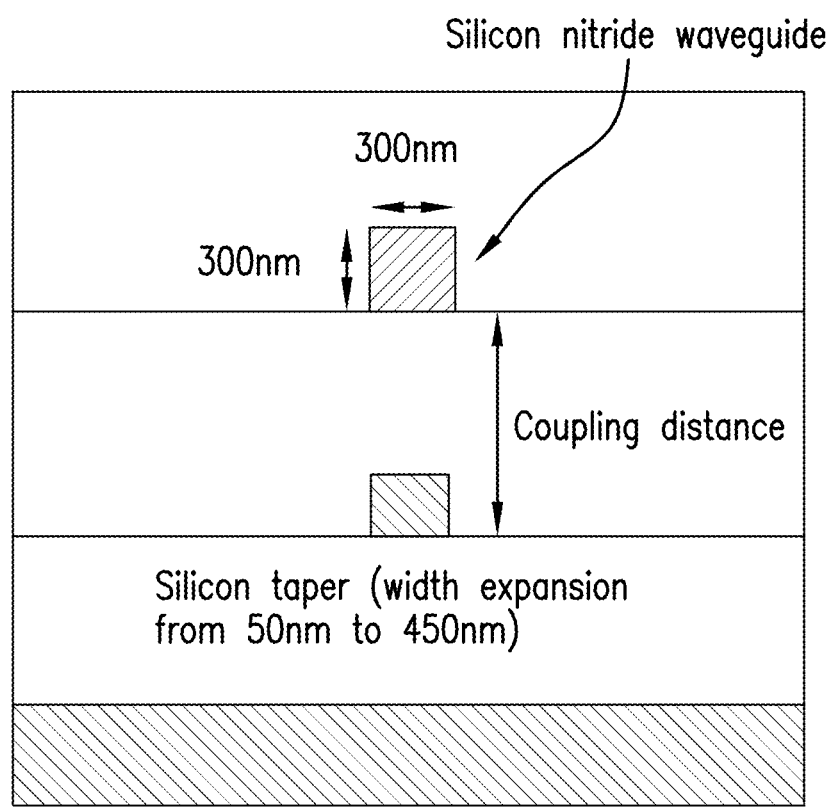
FIG. 24 is an end (facet) view of an example optical coupler.

FIG. 24 shows an example waveguide coupler. Axes are as in FIG. 5. In some examples, evanescent coupling is more efficient when the mode is aligned with Si taper structure than when it is not aligned. For example, a longer taper length may be required if the mode is misaligned with Si taper. The larger the position offset between the mode and the Si taper (coupling distance), the lower the evanescent coupling efficiency (evanescent field falls off exponentially). Therefore, the example shown (only two waveguides) may have coupling loss. By comparison, adding an intermediate coupling step to split one-step evanescent coupling process into two or more steps, e.g., as in FIGS. 2A and 5, can reduce evanescent coupling loss.

Figure 25:
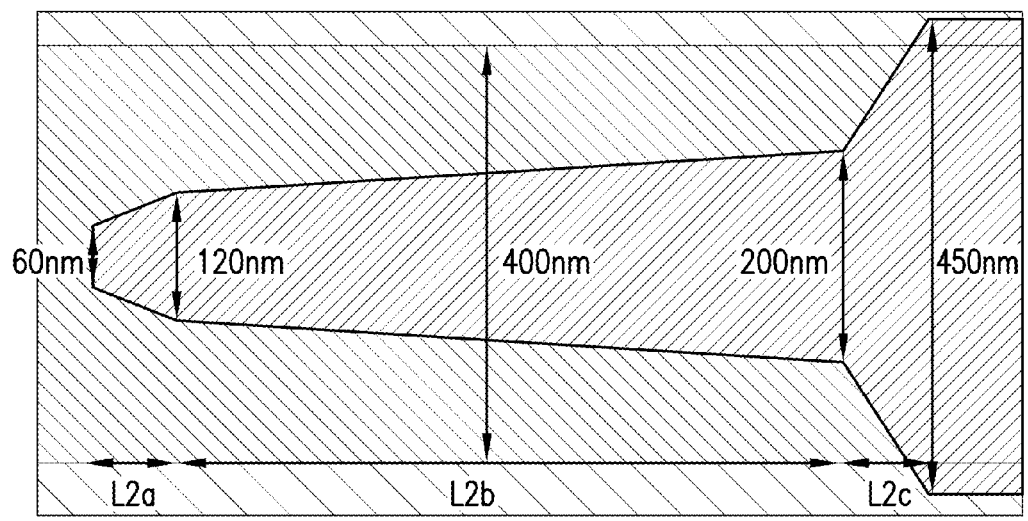
FIG. 25 is a top view of an example waveguide in an example optical coupler.

FIG. 25 shows an example Si waveguide, e.g., in the S0 layer and in the L2 region shown in FIGS. 2A and 2B. The example waveguide uses a piecewise-linear taper where L2b covers the majority of the mode transition. In this example, TM coupling is more efficient than TE. For example, with a 400 μm-long total L2, TM efficiency can be ~100% and TE mode transition efficiency can be ~99%. The piecewise-linear taper can perform more effectively than a single linear taper. In some examples, the waveguide is a total of 500 μm long, providing TE and TM efficiencies >98%.

Figure 26:
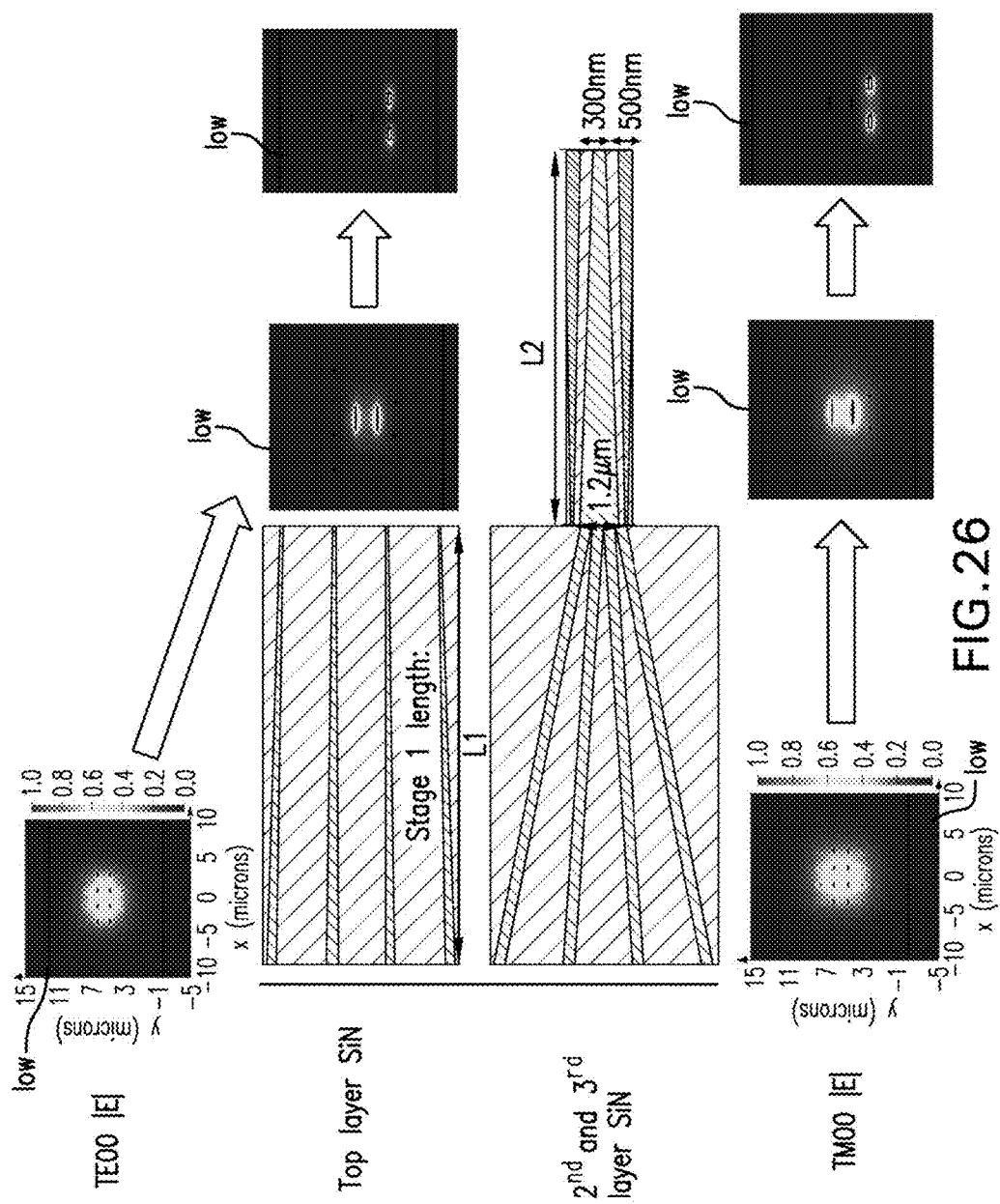
FIG. 26 shows results of a simulation of the electric-field magnitude of electromagnetic radiation of the (top) $TE_{00}$ mode or (bottom) $TM_{00}$ mode, at various positions along the longitudinal axis of an example optical coupler such as that shown in FIGS. 5-6B.

FIG. 26 shows simulation results of a configuration similar to that shown in FIGS. 6A and 6B. Axes and notation are as discussed herein with reference to FIG. 3.

Figure 27:
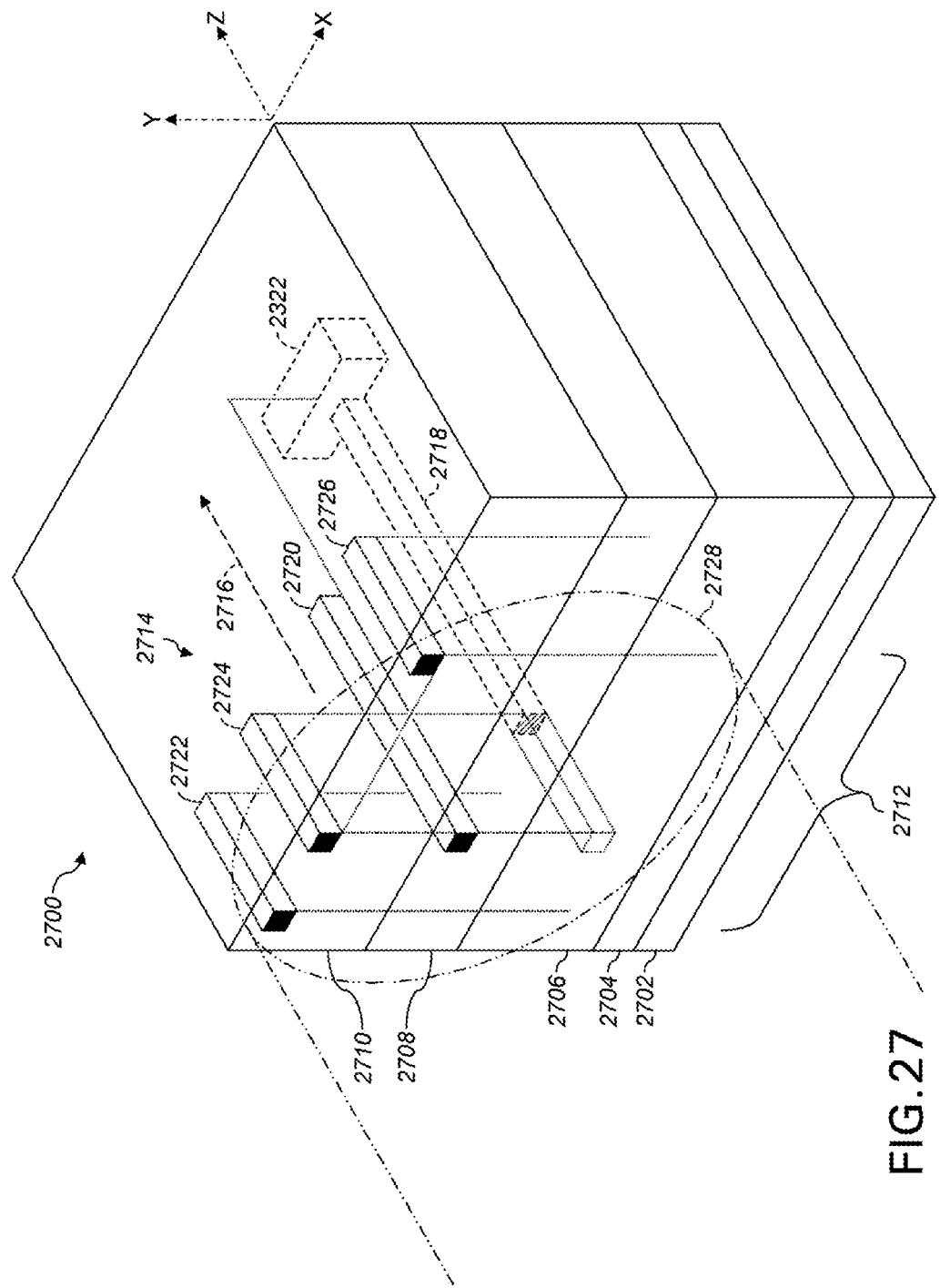
FIG. 27 is an axonometric drawing showing internal components of a silicon photonic device, and related components.

FIG. 27 shows an axonometric drawing showing internal components of a silicon photonic device 2700, e.g., an integrated circuit (IC), and related components. The example of FIG. 27 is similar to the example shown in FIG. 2B. However, for clarity of the drawing, FIG. 27 does not show the waveguide tapers shown in FIG. 2B. Instead, the waveguides are depicted as rectangular prisms. Moreover, the N2 waveguide 2720 reaches facet 2712 in FIG. 27, but the similar N2 waveguide in FIG. 2B does not reach the facet (which is in the −Z direction from L0). In some examples, waveguide 2720 reaches facet 2712 and has a tapered segment beginning substantially at facet 2712. Throughout FIG. 27, dotted lines are used to show spatial relationships, and do not themselves represent components. Other layers can be present in device 2700 other than those shown here. For example, other layers can be applied over upper cladding layer 2710, discussed below. X, Y, and Z axes are shown with dash-dot arrows and are as in FIGS. 2A, 2B, 4A, and 5-8B. The depicted components can constitute the entirety of an IC, or only a portion thereof. For example, layers 2702-2710 can extend beyond the boundaries depicted.

Device 2700 includes substrate 2702, e.g., Si or another semiconductor. A plurality of layers is arranged over the substrate 2702, e.g., in a stack. The layers include cladding layer 2704 (e.g., BOX), lower cladding layer 2706 (e.g., $SiO_2$), intermediate cladding layer 2708 (e.g., $SiO_2$), and upper cladding layer 2710 (e.g., $SiO_2$). The cladding layers 2706, 2708, and 2710 can be part of a lower waveguide assembly (e.g., S0), an intermediate waveguide assembly (e.g., N2), and an upper waveguide assembly (e.g., N1), respectively.

The layers are configured to define a facet 2712 at an edge of the device 2700. The facet 2712 can include a portion of the edge of the device 2700. Additionally or alternatively, the facet 2712 can include an indentation, protrusion, or other structure. Facet 2712 is capable of exchanging light.

The layers are also configured to define an optical coupler 2714 extending away from the facet 2712 at least in a longitudinal direction 2716, e.g., into the IC. For example, direction 2716 can be substantially normal to facet 2712. In some examples, longitudinal direction 2716 is the Z axis shown in FIGS. 2A-4A and 5-22. The optical coupler 2714 can include a plurality of waveguides, each at least partly encapsulated within a corresponding cladding layer. In some examples, each waveguide has a higher refractive index than any of the cladding layer(s) within which it is at least partly encapsulated.

In the illustrated example, lower waveguide 2718 (e.g., Si) is encapsulated within lower cladding layer 2706 (S0). Lower waveguide 2718 does not reach facet 2712. A dotted box extending from lower waveguide 2718 shows more clearly how lower waveguide 2718 is arranged within layer 2706. The end of lower waveguide 2718 closest to facet 2712 is depicted as a hatched quadrilateral.

Intermediate waveguide 2720 is encapsulated within intermediate cladding layer 2708 (N2). Upper waveguides 2722, 2724, and 2726 are encapsulated within upper cladding layer 2710 (N1). Lower waveguide 2718 extends farther from the facet 2712 in the longitudinal direction 2716 than does a second waveguide of the plurality of waveguides. The second waveguide can be, e.g., intermediate waveguide 2720 or any of the upper waveguides 2722, 2724, and 2726. Moreover, any of those choices for the second waveguide is located farther above the substrate 2702 than is the lower waveguide 2718. This arrangement, using dimensions selected as described herein based on the wavelength of light to be coupled, permits light incident on facet 2712 to be effectively coupled to lower waveguide 2718, which can then provide the light to active unit 2322. Additionally or alternatively, light produced by active unit 2322 can be effectively coupled from lower waveguide 2718 out to facet 2712, from which it can be received by a lens, fiber, or other optical system. An example is shown in phantom of fiber 2728 butt-spliced with facet 2712.

In some examples, fiber 2728 can be retained by a V-groove (omitted for clarity of the drawing). For example, fiber 2728 can be held in a V-groove of a V-groove array, e.g., made of PYREX, optical glass, or another glass, or quartz, silicon or another crystalline solid. The V-groove or V-groove array can be retained in position with respect to device 2700, e.g., using optically-clear adhesive (OCA), index-matched adhesive, mechanical retention features such as clips or braces, or other retaining features.

In some examples, device 2700 can include multiple assemblies such as that shown. Each assembly can include, e.g., facet 2712 and optical coupler 2714, or facet 2712, optical coupler 2714, and active unit 2322). The assemblies can be arranged along one edge of an IC or multiple edges, or any combination thereof. For example, multiple copies of the components shown can be included in the IC, spaced apart along the X axis. Accordingly, the depicted axes are not limiting, and any edge of an IC can be used to form optical couplers and other structures shown. In some examples, n couplers are arranged along one edge, and an n-groove V-groove array is retained in position with respect to the n couplers so that n fibers are spliced or otherwise aligned to respective couplers of the n couplers. E.g., n=10.

As discussed herein, the arrangement of waveguides at facet 2712 permits effectively receiving the mode from the fiber with increased tolerance for misalignment compared to prior schemes. Therefore, optical couplers 2714 and devices 2700 as described herein can be used with passive alignment of individual fibers or fiber arrays (e.g., V-groove arrays). Couplers herein can therefore reduce the need for active alignment of fibers or arrays.

In some examples, facet 2712 can receive a free-space signal, e.g., light focused by a lens or other optics on to the facet 2712. In some examples, facet 2712 can emit a free-space signal to be received by another optical component, e.g., another device 2700. Accordingly, in some examples, device(s) 2700 can be used for free-space or fiber-mediated optical communication or power transfer, e.g., chip-to-chip communication or power transfer.

Illustrative Examples

Some examples include at least one of features 1-8, below.

1. An edge coupler for SMF28 or other single-mode fiber. The fiber input can be designed as multi-layer format where mode is coupled down to Si layer via intermediate layer(s).

2. Three layers: one Si, two nitride (or other dielectric).

3. Two nitride layers forming a matrix.

4. An intermediate layer to permit evanescent coupling to be more efficient (require less taper length for the same coupling performance) than direct coupling without intermediate layer.

5. A silicon nitride tip array or matrix deployed at facet to capture input mode. With tip matrix especially, mode can be tailored to increase overlap to a mode in the single-mode fiber.

6. A multi-layer taper embedded in oxide and including a thick buried oxide layer to reduce the leakage (towards Si substrate) while mode coupling down to Si taper.

7. A BOX layer 3 µm thick, or ≥2 µm thick.

8. A taper designed with distinct TE and TM sections to balance performance for both polarization.

In some examples, to design a coupler according to some examples herein, the TE and TM transition windows can be found separately, e.g., based on the material properties or design rules of the silicon process. A transition window is a range of waveguide width expansions during which TE or TM (respectively) mode evolutions can occur and the mode area changes most steeply, e.g., 10%-90% or 20%-80% of the transition. For example, for TM, a relatively wider N2 waveguide can be used compared to TE, so that the evanescent field and the leakage shrink. For TE, a narrow N2 waveguide can be used. Therefore, a coupler can be designed that first uses wider confinement waveguide to hold the mode during TM coupling in order to reduce leakage, then, farther along the length of the waveguide, tapers down the confinement waveguide and starts TE mode coupling with relaxed coupling challenge. In some examples, the TE section is longer to fully utilize the TE transition window. As noted herein, the coupler is bidirectional in some examples. Therefore, light emitted by active unit 2322 can transfer TE fields closer to active unit 2322, then TM fields farther from active unit 2322. After the TE region, width of suspended waveguide can be decreased, as in FIGS. 8A-8B.

Some examples include one or more of, including any combination of any number of, features AA-AM, below. As used herein, references to "dielectric" can additionally or alternatively refer to other materials that have relatively low absorption loss in the wavelength bands of interest, e.g., <10% or <1%. References to "dielectric" can additionally or alternatively refer to TiN, polymers, or other substances having a higher index of refraction than the insulating layer (e.g., the $SiO_2$), e.g., ≤1% higher, ≤5% higher, ≤10% higher, ≤20% higher, about 40% higher, ≤40% higher, ≤50% higher, or ≤100% higher. Similarly, references herein to silicon dioxide (SiO2) can additionally or alternatively refer to silicon oxides with different numbers of Si and O atoms per molecule. References to SiO2 can additionally or alternatively refer to polymers having refractive indexes similar to that of silicon dioxide (e.g., ±5%, ±10%, or ±25%). References herein to silicon nitride (SiN) can additionally or alternatively refer to silicon nitrides with different numbers of Si and N atoms per molecule. References herein to silicon nitride (SiN) can additionally or alternatively refer to polymers having refractive indexes similar to that of silicon nitride (e.g., ±5%, ±10%, or ±25%). In features AA-AM, parenthetical remarks are for example and explanation, and are not limiting. Parenthetical remarks given in this Illustrative Examples section with respect to specific language apply to corresponding language throughout this section, unless otherwise indicated.

AA: An optical coupler (e.g., FIG. 2-8B or 25-27), comprising: a semiconductor substrate; an insulating layer (e.g., BOX) arranged over the semiconductor substrate; and a plurality of waveguide assemblies arranged in a stack (e.g., FIGS. 2A and 2B, left side) over the insulating layer. Each waveguide assembly can include a waveguide and insulator or dielectric at least partly encapsulating the waveguide, e.g., N1, N2, N1U, N1M, N1L, or S0. The plurality of waveguide assemblies can include: a semiconductor waveguide assembly (S0, FIG. 2A, 2B, 5, or 7) arranged over the insulating layer and comprising a tapered semiconductor waveguide (e.g., dark waveguide in FIGS. 2A, 2B, 4; center waveguide in FIGS. 7-8B) at least partly encapsulated in an associated insulating layer (e.g., SiO2); at least one intermediate waveguide assembly (SiN/SiO2 assemblies N1, N1{U,M,L}, N2) arranged over a preceding waveguide assembly of the plurality of waveguide assemblies, each intermediate waveguide assembly comprising at least one dielectric waveguide (e.g., SiN or other dielectric) at least partly encapsulated in an associated insulating layer (e.g., SiO2); and an upper waveguide assembly (e.g., N1, FIGS. 2A and 2B, or N1U, FIGS. 6A and 6B) arranged over an uppermost of the at least one intermediate waveguide assembly, the upper waveguide assembly comprising at least two dielectric waveguides spaced apart laterally, each of the at least two dielectric waveguides at least partly encapsulated in an associated insulating layer (e.g., SiO2).

AB: The optical coupler according to paragraph AA, wherein (at least one of the following, in any combination): the semiconductor substrate comprises monocrystalline silicon; the insulating layer comprises buried oxide (e.g., buried silicon oxide or other semiconductor oxide, or similar-index polymer); the associated insulating layers comprise silicon oxide; or the dielectric waveguides comprise silicon nitride (or, e.g., other nitrides, or similar-index polymer).

AC: The optical coupler according to paragraph AA or AB, further comprising an active unit (e.g., active unit 2322, FIG. 23) optically connected with the semiconductor waveguide (Si in assembly S0).

AD: The optical coupler according to any of paragraphs AA-AC, wherein the at least one intermediate waveguide assembly comprises at least: a first intermediate waveguide assembly (e.g., N2) comprising at most two dielectric waveguides; and a second intermediate waveguide assembly arranged over the first intermediate waveguide assembly (e.g., N1 or N1L) and comprising at least three dielectric waveguides.

AE: The optical coupler according to any of paragraphs AA-AD, wherein the at least one intermediate waveguide assembly comprises at least two intermediate waveguide assemblies (e.g., at least two of N1{U,M,L}), each comprising at least three dielectric waveguides.

AF: The optical coupler according to any of paragraphs AA-AE, wherein at least one of the at least two dielectric waveguides tapers along a length of the at least one of the at least two dielectric waveguides (e.g., as shown in N1U, FIGS. 6A and 6B: each of the four waveguides shown in N1U tapers from wider to narrow while moving left to right across the figure).

AG: The optical coupler according to any of paragraphs AA-AF, wherein at least a first waveguide of the at least two dielectric waveguides approaches at least a second waveguide of the at least two dielectric waveguides along a length of the first waveguide (e.g., as shown in N1U, FIGS. 6A and 6B: each of the four waveguides shown in N1U is arranged so that the separation between the four waveguides reduces while moving left to right across the figure, and the same is true of the waveguides in N1M, N1L).

AH: The optical coupler according to any of paragraphs AA-AG, wherein at least one of the semiconductor waveguide or the dielectric waveguides comprises at least two taper sections having respective, different rates of width taper as a function of distance along a longitudinal axis of the at least one of the semiconductor waveguide or the dielectric waveguides (e.g., FIG. 7 for the semiconductor waveguide, or FIGS. 8A-8B for both the semiconductor waveguide and the dielectric waveguides).

AI: The optical coupler according to any of paragraphs AA-AH, wherein: (e.g., as in FIG. 8A) the semiconductor waveguide comprises a first taper section, followed by a first non-taper section, followed by a second taper section along a longitudinal axis (dashed line) of the semiconductor waveguide; the at least one intermediate waveguide assembly comprises a first intermediate waveguide assembly arranged over the semiconductor waveguide assembly and comprising a first dielectric waveguide; the first dielectric waveguide comprises a second non-taper section, followed by a third taper section, followed by a third non-taper section along a longitudinal axis (dotted line) of the first dielectric waveguide; the first taper section and the second non-taper section are intersected by a first line (dash-dot line) substantially perpendicular to the longitudinal axis (dashed line) of the semiconductor waveguide; the first non-taper section and the third taper section are intersected by a second line (dash-dot line) substantially parallel to the first line and spaced apart from the first line; and the second taper section and the third non-taper section are intersected by a third line (dash-dot line) substantially parallel to the first line and spaced apart from the first line and from the second line. (The locations of the lines in FIG. 8A are for example and are not limiting.)

AJ. A method comprising manufacturing a coupler according to any of claims AA-AI using silicon wafer processing steps.

AK. A device comprising: optical coupler(s) according to any of claims AA-AI; and active unit(s) operatively coupled to respective optical coupler(s).

AL. The device according to paragraph AK, further comprising a processor operatively coupled to the active unit(s) to at least transmit or receive data.

AM. The device according to paragraph AK or AL, the optical coupler(s) comprising a plurality of the optical couplers.

Further Illustrative Examples

Various examples include one or more of, including any combination of any number of, the following example features. Throughout these clauses, parenthetical remarks are for example and explanation, and are not limiting. Other examples of such features may be given throughout this application. Parenthetical remarks given in this Further Illustrative Examples section with respect to specific language apply to corresponding language throughout this document, unless otherwise indicated. Various examples additionally include one or more of, including any combination of any number of, the features listed in the "Illustrative Examples" section above.

A: An optical coupler (e.g., coupler 2324 or 2700, or as in FIG. 2A, 2B, 4A, 5-8B, 26, or 27), comprising: a semiconductor substrate (e.g., an Si or III-V substrate, or substrate 2702; a first cladding layer (e.g., BOX, or layer 2704) arranged over the semiconductor substrate and having a relatively lower refractive index; and a plurality of waveguide assemblies (e.g., S0, N1, N1U, N1M, N1L, N2, or assemblies including cladding layers 2706, 2708, or 2710) arranged in a stack over the first cladding layer, the plurality of waveguide assemblies comprising: a lower waveguide assembly arranged over the first cladding layer and comprising: a lower cladding layer (e.g., 2706) having a relatively lower refractive index; and a tapered lower waveguide (e.g., Si waveguide in layer S0, or waveguide 2718) at least partly encapsulated in the lower cladding layer and having a relatively higher refractive index; at least one intermediate waveguide assembly (e.g., N2, N1L, or N1M) arranged over a preceding waveguide assembly of the plurality of waveguide assemblies, each intermediate waveguide assembly comprising: a respective cladding layer (e.g., layer 2708) having a relatively lower refractive index; and at least one intermediate waveguide (e.g., a high-index waveguide) (e.g., waveguide 2720) (e.g., the single waveguide in layer N2, FIG. 2B, the two waveguides in layer N2, FIG. 5, or the four waveguides in each of layers N1L and N1M, FIG. 5) at least partly encapsulated in the respective cladding layer and having a relatively higher refractive index; and an upper waveguide assembly (e.g., N1, FIG. 2B, or N1U, FIG. 5) arranged over an uppermost of the at least one intermediate waveguide assembly, the upper waveguide assembly comprising: an upper cladding layer having a relatively lower refractive index; and at least two (e.g., three in FIG. 2B; four in FIG. 5) upper waveguides (e.g., waveguides 2722, 2724, and 2726) spaced apart laterally (e.g., within the cladding layer), each of the at least two upper waveguides at least partly encapsulated in the upper cladding layer (e.g., layer 2710) and having a relatively higher refractive index (e.g., the refractive index of each waveguide being higher than the refractive indices of any waveguide(s) that contact or at least partly encapsulate that waveguide).

B: The optical coupler according to paragraph A, wherein: the semiconductor substrate comprises crystalline silicon or a III-V semiconductor; the first cladding layer comprises buried oxide; the respective cladding layers of the at least one intermediate waveguide assembly comprise silicon oxide; the intermediate waveguide comprises silicon nitride; or the at least two upper waveguides comprise silicon nitride.

C: The optical coupler according to paragraph A or B, further comprising an active unit (e.g., an optoelectronic device or other device as discussed herein with reference to active unit 2322) connected with the lower waveguide (e.g., waveguide 2718).

D: The optical coupler according to any of paragraphs A-C, wherein the at least one intermediate waveguide assembly comprises at least: a first intermediate waveguide assembly (e.g., N2, FIG. 5) comprising at most two intermediate waveguides of the corresponding at least one intermediate waveguide; and a second intermediate waveguide assembly (e.g., N1L, FIG. 5) arranged over the first intermediate waveguide assembly and comprising at least three intermediate waveguides of the corresponding at least one intermediate waveguide.

E: The optical coupler according to any of paragraphs A-D, wherein the at least one intermediate waveguide assembly comprises at least two intermediate waveguide assemblies (e.g., N1L and N1M, FIG. 5), each comprising at least three intermediate waveguides of the corresponding at least one intermediate waveguide.

F: The optical coupler according to any of paragraphs A-E, wherein at least a first waveguide of the at least one intermediate waveguide or of the at least two upper waveguides tapers along a length of the first waveguide (e.g., waveguide 2720; see taper in: FIG. 2B, waveguide in layer N2; FIG. 6A, waveguides in L1; FIGS. 8A and 8B: outer waveguides; FIG. 25).

G: The optical coupler according to any of paragraphs A-F, wherein at least a first waveguide of the at least one intermediate waveguide or of the at least two upper waveguides approaches at least a second waveguide of the at least two intermediate waveguides or of the at least two upper waveguides along a length of the first waveguide (e.g., FIG. 2B, in the "L0" region of the N1 layer; or FIG. 6A, 6B, or 26, L1, bottom).

H: The optical coupler according to any of paragraphs A-G, wherein at least a first waveguide of the lower waveguide, the at least one intermediate waveguide, or the at least two upper waveguides comprises at least two taper sections having respective, different rates of width taper as a function of distance along a longitudinal axis of the first waveguide (e.g., the N2 waveguide in FIG. 2B; the rightmost waveguide in FIG. 4A; the center waveguides in FIG. 7; the waveguides in FIG. 8A; the top-center waveguides or the bottom three waveguides in FIG. 8B; or the waveguide in FIG. 25).

I: The optical coupler (e.g., as in example feature AI, above) according to any of paragraphs A-H, wherein: the lower waveguide comprises a first taper section, followed by a first non-taper section, followed by a second taper section along a longitudinal axis of the lower waveguide (e.g., FIG. 8A, S0 waveguide; FIG. 8B, bottom S0 waveguide); the at least one intermediate waveguide assembly comprises a first intermediate waveguide assembly arranged over the lower waveguide assembly and comprising a first intermediate waveguide; the first intermediate waveguide comprises a second non-taper section, followed by a third taper section, followed by a third non-taper section along a longitudinal axis of the first intermediate waveguide; the first taper section and the second non-taper section are intersected by a first line substantially perpendicular to the longitudinal axis of the lower waveguide; the first non-taper section and the third taper section are intersected by a second line substantially parallel to the first line and spaced apart from the first line; and the second taper section and the third non-taper section are intersected by a third line substantially parallel to the first line and spaced apart from the first line and from the second line.

J: The optical coupler according to any of paragraphs A-I, wherein the lower waveguide (e.g., Si) has a higher index of refraction than at least one of the intermediate waveguides (e.g., SiN).

K: An integrated circuit (e.g., SOI) comprising: a substrate (e.g., FIGS. 2A, 2B, 5: Si substrate; FIG. 24: bottom layer; FIG. 27 #2702); a plurality of layers (e.g., other layers in FIGS. 2A, 2B, 5, and 24; FIG. 27 #2704, 2706, 2708, 2710, 2718, 2720, 2722, 2724, 2726) arranged over the substrate and configured to define: a facet (e.g., FIG. 27 #2712) at an edge of the integrated circuit; and an optical coupler (e.g., coupler 2324 or 2714, or as in FIG. 2A, 2B, 4A, 5-8B, 26, or 27) extending away from the facet at least in a longitudinal direction (e.g., the Z axis); wherein: the optical coupler comprises a plurality of waveguides (e.g., FIGS. 2A, 2B, 4A, 5-8B, 24-26: Si, SiN, and other waveguides, e.g., in N1, N1U, N1M, N1L, N2, or S0 layers; FIG. 27 #2718, 2720, 2722, 2724), each at least partly encapsulated within a corresponding cladding layer (e.g., FIGS. 2A, 2B, 4A, 5-8B, 24-26: SiO$_2$ and other cladding layers, e.g., in N1, N1U, N1M, N1L, N2, S0, or BOX layers; FIG. 27 #2704, 2706, 2708, 2710); a first waveguide (e.g., S0 waveguides; FIG. 27 #2718) of the plurality of waveguides extends farther from the facet in the longitudinal direction than does a second waveguide (e.g., N1, N1U, N1M, N1L, or N2 waveguides; FIG. 27 #2720, 2722, 2724, or 2726) of the plurality of waveguides; and the second waveguide is located farther above the silicon substrate than is the first waveguide.

L: The integrated circuit according to paragraph K, wherein the waveguides of the plurality of waveguides have higher refractive indices than the corresponding cladding layers (e.g., in FIG. 2B, the Si waveguide has a higher index than the SiO$_2$ S0 layer and than the BOX layer; or in FIG. 27, #2718 has a higher index than #2706; #2720 than #2708; or all of #2722, 2724, and 2726 than #2710) (e.g., each waveguide can have a higher index than the highest index of any of the cladding layers it touches or in which it is at least partly encapsulated).

M: The integrated circuit according to paragraph K or L, further comprising an active unit (e.g., a photodiode or semiconductor laser) (e.g., FIGS. 23 and 27 #2322) arranged over the substrate, wherein the optical coupler (e.g., #2714) is disposed at least partly between (e.g., along the longitudinal axis, e.g., the Z axis) the facet (e.g., #2712) and the active unit (e.g., FIG. 27 #2322).

N: The device according to paragraph M, further comprising a processor (e.g., FIG. 23 #2386) operatively coupled to the active unit(s) to at least transmit or receive data.

O: The device according to paragraph M or N, wherein: the device further comprises a plurality of active units, the plurality of active units comprising the active unit; the plurality of layers are further configured to define: a plurality of facets at the edge of the integrated circuit, the plurality of facets comprising the facet; and a plurality of optical couplers disposed at least partly between respective facets of the plurality of facets and respective active units of the plurality of active units, the plurality of optical couplers comprising the optical coupler; each optical coupler of the plurality of optical couplers defines a respective longitudinal axis; and each optical coupler of the plurality of optical couplers comprises: a first waveguide arranged relatively closer to the respective active unit in the longitudinal direction and relatively closer to the substrate; and a second waveguide arranged relatively farther from the respective active unit in the longitudinal direction and relatively farther from to the substrate (e.g., multiple copies of the components shown in FIG. 27, arranged along the X axis).

P: The device according to paragraph O, wherein: the plurality of layers comprises a first layer (e.g., S0 or N2) and a second layer (e.g., N2 or N1, respectively); the first layer is arranged at least partly between the substrate and the second layer; the respective first waveguides of the plurality of optical couplers are arranged in the first layer; and the respective second waveguides of the plurality of optical couplers are arranged in the second layer (e.g., multiple couplers on a single die, the couplers sharing a common layer arrangement or stackup) (e.g., in FIG. 27, the first layer can be #2706, the first waveguides #2718, the second layer #2708, and the second waveguides #2720).

Q: An assembly comprising: a semiconductor photonic device having: a substrate; a plurality of facets (e.g., FIG. 27 #2712 or the faces shown in FIG. 2A, 2B, 5, or 24); and a plurality of optical couplers (e.g., coupler 2324 or 2700, or as in FIG. 2A, 2B, 4A, 5-8B, 26, or 27) associated with respective facets of the plurality of facets; and a plurality of single-mode optical fibers (e.g., FIG. 27 #2728) (or, e.g., fibers of other types, e.g., multimode or polarization-maintaining) disposed in a splice configuration (e.g., butted against or otherwise as discussed herein near the discussion of connector 2328, or with respect to FIG. 27) with respect to respective facets of the plurality of facets; wherein each optical coupler of the plurality of optical couplers comprises means for coupling an electromagnetic field incident on the facet towards the substrate as the electromagnetic field proceeds into the semiconductor photonic device (e.g., an emitter or receiver of light).

R: The assembly according to paragraph Q, further comprising a V-groove array (e.g., as discussed herein with reference to FIG. 27) configured to retain the single-mode optical fibers in position with respect to the respective facets.

S: The assembly according to paragraph Q or R, wherein each optical coupler comprises: a respective first waveguide (e.g., S0, or FIG. 27 #2718) disposed over the substrate; and a respective second waveguide (e.g., N1 or N2, or FIG. 27 #2720-2726) disposed over the substrate, the respective second waveguide being farther from the substrate than the respective first waveguide and extending closer to the respective facet than the respective first waveguide.

T: The assembly according to paragraph S, wherein each optical coupler further comprises a respective third waveguide (e.g., FIGS. 2A-2B any two of the N1 waveguides; FIG. 5 either waveguide in N2, or any three of the N1U, N1M, or N1L waveguides; FIG. 27 any two of #2722-2726) disposed in a common layer with the respective second waveguide and laterally spaced apart from the respective second waveguide.

U: The assembly according to paragraph S or T, wherein the respective first waveguides and the respective second waveguides: are at least partly encapsulated in corresponding cladding layers; and have respective indices of refraction that are higher than respective indices of refraction of the corresponding cladding layers (e.g., as in feature L, above).

Conclusion

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, or executed in parallel to implement the described processes. The described processes can be performed by resources associated with one or more computing systems 2301, 2302 or processors 2386, such as one or more internal or external CPUs or GPUs, or one or more pieces of hardware logic such as FPGAs, DSPs, or other types of accelerators.

The methods and processes described above can be embodied in, and fully automated via, software code modules executed by one or more general purpose computers or processors. The code modules can be stored in any type of computer-readable storage medium or other computer storage medium. Some or all of the methods can alternatively be embodied in specialized computer hardware. For example, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example. The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

Although some features and examples herein have been described in language specific to structural features or methodological steps, it is to be understood that the subject matter herein is not necessarily limited to the specific features or steps described. Any process descriptions, elements or blocks in the flow diagrams described herein or depicted in the attached figs should be understood as potentially representing modules, segments, or portions of code that include one or more executable instructions for implementing specific logical functions or elements in the process. Alternate implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:
1. An optical coupler, comprising:
a semiconductor substrate;
a first cladding layer arranged over the semiconductor substrate and having a relatively lower refractive index; and
a plurality of waveguide assemblies stacked vertically over the first cladding layer, the plurality of waveguide assemblies comprising:
a lower waveguide assembly arranged over the first cladding layer and comprising:
a lower cladding layer having a relatively lower refractive index; and
a tapered lower waveguide being at least partly encapsulated in the lower cladding layer and having a relatively higher refractive index;
a first intermediate waveguide assembly comprising:
a first intermediate cladding layer having a relatively lower refractive index; and
two first intermediate waveguides spaced laterally from each other, each of the first intermediate waveguides being at least partly encapsulated in the first intermediate cladding layer and having a relatively higher refractive index; and an upper waveguide assembly arranged over the first intermediate waveguide assembly, the upper waveguide assembly comprising:
an upper cladding layer having a relatively lower refractive index, the upper cladding layer having a smaller extent vertically than does the first intermediate cladding layer; and
at least two upper waveguides spaced laterally from each other, each of the at least two upper waveguides being at least partly encapsulated in the upper cladding layer and having a relatively higher refractive index.

2. The optical coupler according to claim 1, wherein:
the semiconductor substrate comprises crystalline silicon or a III V semiconductor;
the first cladding layer comprises buried oxide;
the first intermediate cladding layer comprises silicon oxide;
each of the two first intermediate waveguides comprises silicon nitride; or
the at least two upper waveguides comprise silicon nitride.

3. The optical coupler according to claim 1, further comprising an active unit connected with the lower waveguide.

4. The optical coupler according to claim 1, further comprising:
a second intermediate waveguide assembly being disposed vertically between the upper waveguide assembly and the first intermediate waveguide assembly and comprising:
a second intermediate cladding layer; and
at least four second intermediate waveguides spaced apart laterally from each other and at least partly encapsulated in the second intermediate cladding layer; and
a third intermediate waveguide assembly being disposed vertically between the upper waveguide assembly and the second intermediate waveguide assembly and comprising:
a third intermediate cladding layer; and
at least four third intermediate waveguides spaced apart laterally from each other and at least partly encapsulated in the third intermediate cladding layer,
wherein the upper waveguide assembly comprises at least four upper waveguides spaced apart laterally from each other.

5. The optical coupler according to claim 1, wherein at least a first waveguide of the first intermediate waveguides or of the upper waveguides tapers along a length of the first waveguide.

6. The optical coupler according to claim 1, wherein at least a first waveguide of the first intermediate waveguides or of the upper waveguides approaches at least a second waveguide of the first intermediate waveguides or of the upper waveguides along a length of the first waveguide.

7. The optical coupler according to claim 1, wherein at least a first waveguide of the lower waveguide, the first intermediate waveguides, or the upper waveguides comprises at least two taper sections having respective, different rates of width taper as a function of distance along a longitudinal axis of the first waveguide.

8. The optical coupler according to claim 1, wherein:
the lower waveguide comprises a first taper section, followed by a first non-taper section, followed by a second taper section along a longitudinal axis of the lower waveguide;
each of the first intermediate waveguides comprises a second non-taper section, followed by a third taper section, followed by a third non-taper section along a longitudinal axis of the first intermediate waveguide;
the first taper section and the second non-taper section are intersected by a first line substantially perpendicular to the longitudinal axis of the lower waveguide;
the first non-taper section and the third taper section are intersected by a second line substantially parallel to the first line and spaced apart from the first line; and
the second taper section and the third non-taper section are intersected by a third line substantially parallel to the first line and spaced apart from the first line and from the second line.

9. The optical coupler according to claim 1, wherein the lower waveguide has a higher index of refraction than at least one of the first intermediate waveguides.

10. An integrated circuit comprising:
the optical coupler of claim 1, the optical coupler being configured to define a facet at an edge of the integrated circuit, the
optical coupler extending away from the facet at least in a longitudinal direction.

11. The integrated circuit according to claim 10, further comprising an active unit arranged over the substrate, wherein the plurality of waveguide assemblies is disposed at least partly between the facet and the active unit.

12. The integrated circuit according to claim 11, wherein:
the device further comprises a plurality of active units, the plurality of active units comprising the active unit;
the device further comprises a plurality of optical couplers including the optical coupler;
the plurality of waveguide assemblies is further configured to define:
a plurality of facets at the edge of the integrated circuit, the plurality of facets comprising the facet; and
a plurality of optical couplers disposed at least partly between respective facets of the plurality of facets and respective active units of the plurality of active units, the plurality of optical couplers comprising the optical coupler; and
each optical coupler of the plurality of optical couplers defines a respective longitudinal axis.

13. The optical coupler according to claim 1, wherein:
the first cladding layer comprises a buried oxide layer,
each of the lower cladding layer, the first intermediate cladding layer, and the upper cladding layer comprises silicon oxide,
the tapered lower waveguide comprises silicon, and
the upper waveguides and the first intermediate waveguides comprise silicon nitride.

14. The optical coupler according to claim 1, wherein the at least two upper waveguides comprise three tapered waveguides.

15. The optical coupler according to claim 1, further comprising:
a second intermediate waveguide assembly being disposed vertically between the upper waveguide assembly and the first intermediate waveguide assembly and comprising:
a second intermediate cladding layer; and
at least three second intermediate waveguides spaced apart laterally from each other and at least partly encapsulated in the second intermediate cladding layer, wherein the upper waveguide assembly comprises at least three upper waveguides spaced apart laterally from each other.

16. The optical coupler according to claim 1, wherein:
the at least two upper waveguides extend from a facet in a longitudinal direction,
the tapered lower waveguide is spaced apart from the facet in the longitudinal direction, and
the two first intermediate waveguides are spaced apart from the facet in the longitudinal direction.

17. The optical coupler according to claim 1, further comprising:
a matrix of waveguide tips configured to receive incident radiation, the matrix of waveguide tips comprising three rows of four waveguides,
wherein the three rows are stacked vertically, the waveguides in each of the rows are laterally spaced apart from each other, and one of the rows of four waveguides comprises the at least two upper waveguides.

18. The optical coupler according to claim 4, wherein each of the second intermediate cladding layer and the third intermediate cladding layer has a shorter vertical thickness than the first intermediate cladding layer.

19. An optical coupler, comprising:
a semiconductor substrate;
a buried oxide layer disposed above the semiconductor substrate; and
a plurality of waveguide assemblies stacked in a vertical direction above the first cladding layer, the plurality of waveguide assemblies comprising:
a lower waveguide assembly comprising:
a lower cladding layer; and
a tapered lower waveguide at least partly encapsulated in the lower cladding layer and having a higher refractive index than the lower cladding layer and the first cladding layer;
a first intermediate waveguide assembly comprising:
a first intermediate cladding layer; and
two first intermediate waveguides at least partly encapsulated in the first intermediate cladding layer, and having a higher refractive index than the intermediate cladding layer;
an upper waveguide assembly comprising:
an upper cladding layer having a narrower vertical thickness than the first intermediate cladding layer; and
four upper waveguides spaced apart from each other in the lateral direction and at least partly encapsulated in the upper cladding layer, the upper waveguides having a higher refractive index than the upper cladding layer; and
a second intermediate waveguide assembly disposed between the first intermediate waveguide assembly and the upper waveguide assembly, the second intermediate waveguide assembly comprising:
a second intermediate cladding layer having a narrower vertical thickness than the first intermediate cladding layer; and
four second intermediate waveguides spaced apart from each other in the lateral direction, at least partly encapsulated in the second intermediate cladding layer, and aligned with the four upper waveguides in the vertical direction, the second intermediate waveguides having a higher refractive index than the second intermediate cladding layer.

* * * * *